US012411654B1

(12) United States Patent
Kessler et al.

(10) Patent No.: US 12,411,654 B1
(45) Date of Patent: Sep. 9, 2025

(54) VOICE CONTROL HUB METHODS AND SYSTEMS

(71) Applicant: CDW LLC, Vernon Hills, IL (US)

(72) Inventors: Joseph Kessler, Grayslake, IL (US); Suresh Bellam, Vernon Hills, IL (US); Andre Coetzee, Cary, IL (US); Dan Verdeyen, Glenview, IL (US)

(73) Assignee: CDW LLC, Vernon Hills, IL (US)

( * ) Notice: Subject to any disclaimer, the term of this patent is extended or adjusted under 35 U.S.C. 154(b) by 0 days.

(21) Appl. No.: 18/176,461

(22) Filed: Feb. 28, 2023

Related U.S. Application Data

(63) Continuation of application No. 16/519,736, filed on Jul. 23, 2019, now abandoned.

(51) Int. Cl.
*G06F 3/16* (2006.01)
*G06F 40/295* (2020.01)
(Continued)

(52) U.S. Cl.
CPC ............ *G06F 3/167* (2013.01); *G06F 40/295* (2020.01); *G06F 40/30* (2020.01); *G06N 20/00* (2019.01);
(Continued)

(58) Field of Classification Search
CPC ........ G06F 3/167; G06F 40/295; G06F 40/30; G10L 13/00; G10L 15/1815; G10L 15/22;
(Continued)

(56) References Cited

U.S. PATENT DOCUMENTS

| 6,427,234 B1 * | 7/2002 | Chambers ........... G06F 9/45516 717/148 |
| 10,720,150 B2 | 7/2020 | Asumu et al. |

(Continued)

OTHER PUBLICATIONS

Dynamic Compilation, http:/web.archive.org/web/20160717051701/ https://c2.com/cgi/wiki?DynamicCompilation, retrieved using The Wayback Machine(http://web.archive.org), Jul. 17, 2016 (Year: 2016).*

(Continued)

*Primary Examiner* — Nicholas Ulrich
(74) *Attorney, Agent, or Firm* — MARSHALL, GERSTEIN & BORUN LLP; Randall G. Rueth

(57) ABSTRACT

A system includes a processor, and a memory containing instructions that, when executed, cause the voice control hub computing system to receive a request; receive and transmit an utterance; convert the utterance to a string; analyze the string using a machine learning model trained using a command interpreter; and receive and dispatch the intent and the entity. A method includes receiving a request; receiving and transmitting an utterance; converting the utterance to a string; analyzing the string using a machine learning model trained using a command interpreter; and receiving and dispatching the intent and the entity. A non-transitory computer readable medium containing program instructions that when executed, cause a computer to: receive a request; receive and transmit an utterance; convert the utterance to a string; analyze the string using a machine learning model trained using a command interpreter; and receive and dispatch the intent and the entity.

20 Claims, 9 Drawing Sheets

(51) Int. Cl.
*G06F 40/30* (2020.01)
*G06N 20/00* (2019.01)
*G06V 10/70* (2022.01)
*G10L 13/00* (2006.01)
*G10L 15/08* (2006.01)
*G10L 15/18* (2013.01)
*G10L 15/22* (2006.01)
*G10L 15/30* (2013.01)

(52) U.S. Cl.
CPC .............. *G06V 10/70* (2022.01); *G10L 13/00* (2013.01); *G10L 15/1815* (2013.01); *G10L 15/22* (2013.01); *G10L 15/30* (2013.01); *G10L 2015/088* (2013.01); *G10L 2015/223* (2013.01)

(58) Field of Classification Search
CPC .............. G10L 15/30; G10L 2015/088; G10L 2015/223; G06N 20/00; G06V 10/70
See application file for complete search history.

(56) References Cited

U.S. PATENT DOCUMENTS

| | | |
|---|---|---|
| 2003/0156130 A1 | 8/2003 | James et al. |
| 2003/0163320 A1 | 8/2003 | Yamazaki et al. |
| 2005/0177821 A1* | 8/2005 | Ogata ................ G06F 11/3636 717/148 |
| 2006/0136220 A1 | 6/2006 | Gurram et al. |
| 2008/0140398 A1* | 6/2008 | Shpigel ................ G10L 15/26 704/E15.04 |
| 2009/0187410 A1 | 7/2009 | Wilpon et al. |
| 2013/0246050 A1 | 9/2013 | Yu et al. |
| 2014/0019849 A1 | 1/2014 | Campbell et al. |
| 2014/0330569 A1 | 11/2014 | Kolavennu et al. |
| 2016/0148612 A1* | 5/2016 | Guo ...................... G06F 40/237 704/257 |
| 2018/0261223 A1 | 9/2018 | Jain et al. |
| 2018/0366144 A1 | 12/2018 | Ashoori et al. |
| 2019/0087691 A1* | 3/2019 | Jelveh .................. G06N 3/084 |
| 2019/0206405 A1* | 7/2019 | Gillespie ............ G06Q 30/0201 |
| 2019/0259374 A1 | 8/2019 | Kwon et al. |
| 2019/0260866 A1 | 8/2019 | Choi et al. |
| 2019/0348044 A1 | 11/2019 | Chun et al. |

OTHER PUBLICATIONS

U.S. Appl. No. 16/519,736, Voice Control Hub Methods and Systems, filed Jan. 28, 2021.

* cited by examiner

VOICE CONTROL HUB METHODS AND SYSTEMS

CROSS-REFERENCE TO RELATED APPLICATIONS

This application is a continuation of application Ser. No. 16/519,736, entitled VOICE CONTROL HUB METHODS AND SYSTEMS, filed on Jul. 23, 2019, which is incorporated herein by reference in its entirety.

FIELD OF THE DISCLOSURE

The present disclosure is generally directed to methods and systems for automated graphical user interface control methods and systems and, more particularly, to techniques for accessing and controlling graphical user interfaces using vocal commands uttered by a user of an application.

BACKGROUND

Existing enterprise systems used to manage an organization's relationships and interactions with customers (e.g., a Customer Relationship Management (CRM) system or a Quantitative Risk Management (QRM) system) require employees to perform repetitive tasks. Existing consumer voice-based systems such as Google Assistant, Amazon Alexa, etc. are proprietary systems that do not allow an enterprise to meaningfully integrate those systems with internal enterprise systems. Such consumer systems have several drawbacks. First, consumer systems do not include a public application programming interface (API). Second, consumer systems are geared toward consumer development and require sensitive data to transit networks and data centers controlled by third parties. Using such networks and data centers represent security and data privacy risks. Such systems are simply not intended to access enterprise data. Third, consumer systems base understanding of utterances on template programming. Therefore, such systems are brittle, and unable to process slight variations in speech. When voice response is based upon templates, it is generally not customizable for specific business use cases/contexts. Fourth, consumer systems do not allow a user (e.g., a developer) to access integrated functions in a process located within an enterprise computing environment, or to keep such processes located on the premises of the enterprise. Rather, the consumer system owner requires that all access occur in a captive cloud environment. An enterprise may choose to exempt certain network access through the network firewall of the enterprise, but to do so weakens security across the enterprise, and other teams may object (e.g., an InfoSec team). Fifth, any reaction to a spoken utterance is generated by the consumer system, not a local process. Sixth, the requirement to access remote cloud-based resources causes latencies in processing that may be frustrating to end users.

In many cases, consumer voice system APIs are rigid and cannot be integrated with legacy applications due to a mismatch between the programming capabilities of the consumer voice systems and the older applications. A further drawback of existing voice systems is that they provide no facilities to allow a user to specify custom voice commands, because response actions are hard-coded. In other words, whatever functionality the owner of the consumer voice system chose is available to the user, and the user cannot express any other voice commands. The user has no ability to change fundamental design decisions, such as the method for accessing the consumer voice system. Moreover, as business imperatives shift over time, the set of available commands may become quickly outdated. Further, existing systems require developers to write code to implement voice functionality, which is time-consuming and error-prone. Existing systems to not include any facilities that allow end users to create voice code-free voice functionality.

BRIEF SUMMARY

In one aspect, a voice control hub computing system for performing a task within an enterprise business software application includes one or more processors, and a memory containing instructions that, when executed, cause the voice control hub computing system to: (1) receive a handler registration request specifying an object handler to respond to voice commands; (2) receive an utterance of a user of the enterprise business software application; (3) transmit the utterance of the user to a remote cloud services layer; (4) convert the utterance of the user to a text string representing speech-to-text output using a custom speech model; (5) analyze the text string using one or more trained machine learning models to generate an intent and an entity corresponding to the task, wherein each of the models is trained using a respective command interpreter for interpreting utterances of a respective type; (6) receive the intent and the entity from the remote cloud services layer, wherein the intent is associated with the entity; and (7) dispatch the intent and the entity to the object handler.

In another aspect, a computer-implemented method for enabling voice functionality in an enterprise business software application includes (1) receiving a handler registration request specifying an object handler to respond to voice commands; (2) receiving an utterance of a user of the enterprise business software application; (3) transmitting the utterance of the user to a remote cloud services layer; (4) converting the utterance of the user to a text string representing speech-to-text output using a custom speech model; (5) analyzing the text string using one or more trained machine learning models to generate an intent and an entity corresponding to a task, wherein each of the models is trained using a respective command interpreter for interpreting utterances of a respective type; (6) receiving the intent and the entity from the remote cloud services layer, wherein the intent is associated with the entity; and (7) dispatching the intent and the entity to the object handler.

In yet another aspect, a non-transitory computer readable medium includes program instructions that when executed, cause a computer to: (1) receive a handler registration request specifying an object handler to respond to voice commands; (2) receive an utterance of a user of the enterprise business software application; (3) transmit the utterance of the user to a remote cloud services layer; (4) convert the utterance of the user to a text string representing speech-to-text output using a custom speech model; (5) analyze the text string using one or more trained machine learning models to generate an intent and an entity corresponding to the task, wherein each of the models is trained using a respective command interpreter for interpreting utterances of a respective type; (6) receive the intent and the entity from the remote cloud services layer, wherein the intent is associated with the entity; and (7) dispatch the intent and the entity to the object handler.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, techniques for voice control of enterprise systems. In an embodiment, voice control hub methods and systems implement components for adding voice control capabilities to an application and/or business objects. Another embodiment relates to automated user interface (GUI) control methods and systems using voice commands. Yet another embodiment includes visual programming methods and systems for intent dispatch. Another embodiment includes the use of a computer vision technique (e.g., a trained convolutional neural network (CNN)) to identify graphical user interface controls for use in, inter alia, voice control applications. The embodiments disclosed herein allow enterprise employees (e.g., a user, administrator, manager, programmer, etc.) to, inter alia, add cloud-based voice functionality to business objects, retrofit legacy applications to include voice capabilities, automate applications using voice capabilities for robotic process automation (RPA), and create palettes of actions for intents.

Exemplary Computing Environment

Figure 1:
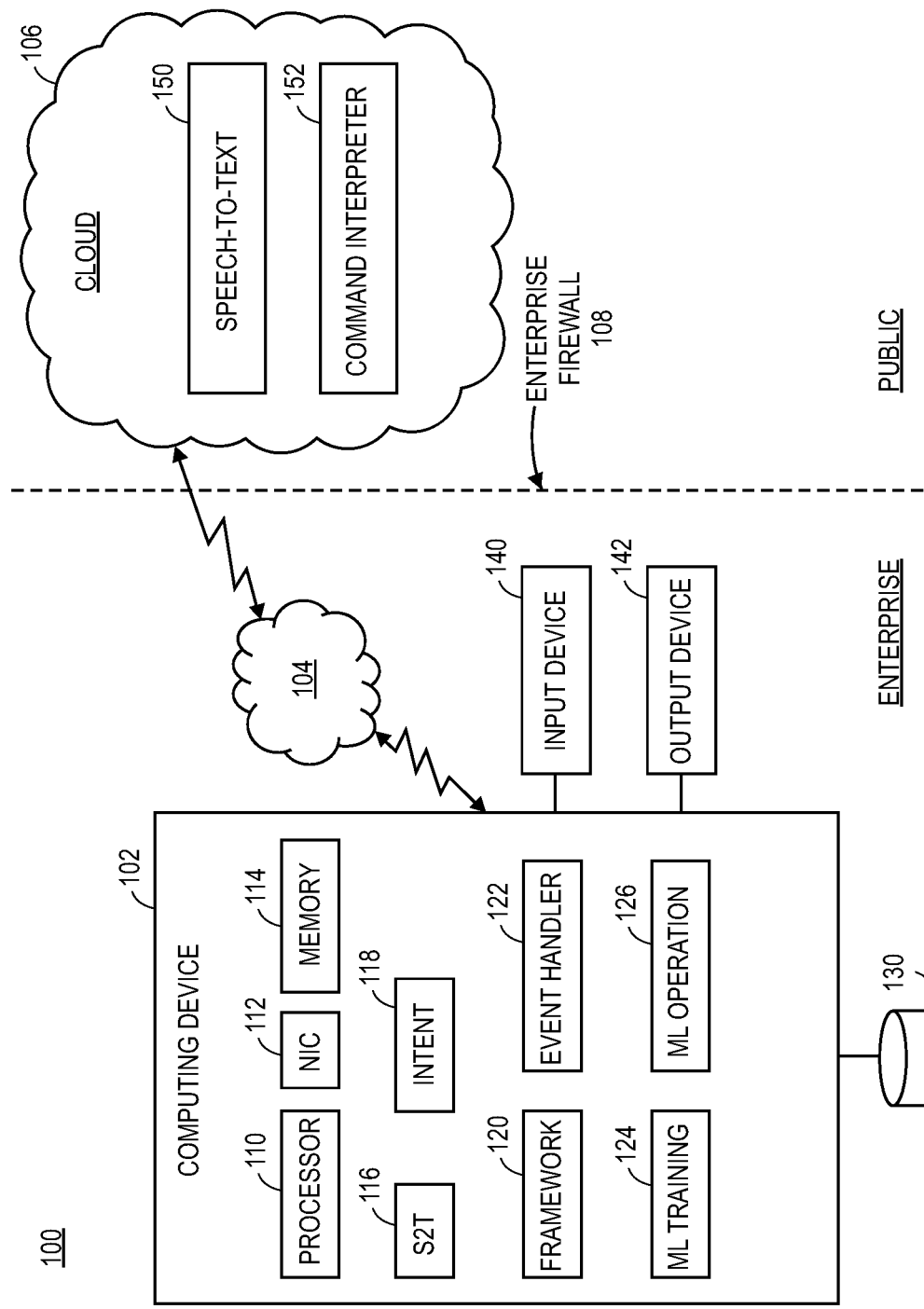
FIG. 1 depicts an exemplary computing environment in which techniques for voice control of enterprise systems may be implemented, according to one embodiment.

FIG. 1 depicts an exemplary computing environment 100 in which the techniques disclosed herein may be implemented, according to an embodiment. The enterprise environment 100 includes a computing device 102, a network 104, and a cloud 106. Some embodiments may include a plurality of computing devices 102. The enterprise environment 100 may include a logical separation, corresponding to a respective private enterprise logical portion and a public logical portion.

Generally, the computing device 102 is located in the private enterprise logical portion of the environment 100, as demarcated by an enterprise firewall 102 of FIG. 1. For example, the enterprise logical portion may correspond to a networking subgroup that is located behind the enterprise firewall 108. The enterprise firewall 108 may be established by, for example, a software and/or hardware router.

The computing device 102 may be an individual server, a group (e.g., cluster) of multiple servers, or another suitable type of computing device or system (e.g., a collection of computing resources). For example, the computing device 102 may be any suitable computing device (e.g., a server, a mobile computing device, a smart phone, a tablet, a laptop, a wearable device, etc.). In some embodiments, one or more components of the computing device 120 may be provided by virtual instances (e.g., cloud-based virtualization services). In such cases, one or more computing device 102 may be included in the public logical portion of the computing environment 100. One or more computing device 102 located in the enterprise portion of the computing environment 100 may be linked to one or more computing device 102 located in the public portion of the environment 100 via the network 104.

The network 104 may be a single communication network, or may include multiple communication networks of one or more types (e.g., one or more wired and/or wireless local area networks (LANs), and/or one or more wired and/or wireless wide area networks (WANs) such as the Internet). The network 104 may enable bidirectional communication between the computing device 102 and the cloud 106, or between multiple computing devices 102, for example. The network 104 may be located within the enterprise logical portion and/or within the public logical portion of the computing environment 100.

The computing device 102 includes a processor 110 and a network interface controller (NIC) 112. The processor 110 may include any suitable number of processors and/or processor types, such as CPUs and one or more graphics processing units (GPUs). Generally, the processor 110 is configured to execute software instructions stored in a memory 114. The memory 114 may include one or more persistent memories (e.g., a hard drive/solid state memory) and stores one or more set of computer executable instructions/modules, including a speech-to-text module 116, an intent module 118, a framework module 120, an event handler module 122, a machine learning (ML) training module 124, an ML operation module 126, etc., as described in more detail below.

The NIC 112 may include any suitable network interface controller(s), such as wired/wireless controllers (e.g., Ethernet controllers), and facilitate bidirectional/multiplexed networking over the network 104 between the computing device 102 and other components of the environment 100 (e.g., another computing device 102, the cloud 106, etc.).

The memory 114 includes one or more modules for implementing specific functionality. For example, in an embodiment, the memory 114 includes a speech-to-text module 116 for accessing a speech-to-text API of a cloud computing environment (e.g., the cloud 106). The speech-to-text module 116 includes computer-executable instructions for receiving audio speech data from an input device of the computing device 102, and for transmitting the audio speech data to via the network 104. The speech-to-text module 116 may include instructions for receiving audio speech data periodically, continuously, and/or in response to a user action via an input device of the computing device 102. The speech-to-text module 116 may receive textual output corresponding to the transmitted audio speech data. The speech-to-text module 116 may receive a string of structured data (e.g., JSON) including the textual output produced by the speech-to-text API, and pass the string to the intent module 118.

For example, the audio speech data may include a user query. Herein, a "user" may be a developer of an enterprise application, an end user of that application (e.g., a business person), etc. The speech-to-text API may translate the audio speech data to a string query (e.g., "Who is Joe's manager?") and forward the string query to the intent module 118. The string query may be provided by the user as a spoken utterance, as a typed phrase, etc. Additional examples of user queries may include, inter alia, a command to swipe the user in ("Swipe me in."), a command to query vacation balance ("What is my vacation balance?"), a command to find a phone extension of a person ("What is the phone extension for Bob Smith?"), a request for personnel information ("Who is the manager for Bob Smith?"), etc. Each query may receive a response from the cloud 106. For example, response to the above user queries regarding vacation balance may include "Your vacation balance is 3 weeks, 7 hours". In some cases, the response may be a number of seconds that may be converted to a number of weeks and seconds. The telephone extension response may be a telephone extension number (e.g., 6543). The response may to an organizational query may be a tree structure such as a node of a manager (e.g., Jane Doe) having a leaf note of a subordinate employee (e.g., Bob Smith). In each case, the intent module 118 may include a set of computer-executable instructions for analyzing the query response.

The intent module 118 may include computer-executable instructions for transmitting a request, and receiving and/or retrieving a response from a command interpreter API of the cloud 106. The request may include a textual string, such as the textual output received by the speech-to-text module 116 (e.g., the string of structured data). The intent module 118 may retrieve a subpart of structured data (e.g., a hash value) from the structured data corresponding to the text corresponding to a vocal utterance (e.g., "Who is Joe's manager?") The intent module 118 may include the text in a request to the command interpreter API. The intent module 118 may retrieve/receive the response from the command interpreter API and forward the response to the framework module 120 and/or the event handler 122 for further processing. Continuing the above example, the command interpreter API may return a response such as the following:

```
{
    "query": "who is joe smith's manager?",
    "topScoringIntent": {
        "intent": "Query_ManagerName",
        "score": 0.797840059
    },
    "intents": [
    {
        "intent": "Query_ManagerName",
        "score": 0.797840059
    },
    {
        "intent": "Query_ManagerOfficePhone",
        "score": 0.5884016
    },
    {
        "intent": "Action_GoToManagerByName",
        "score": 0.4812061
    },
    {
        "intent": "Query_CellPhone",
        "score": 0.4402233
    },
    {
        "intent": "Query_HomeAddress",
        "score": 0.201515391
    },
    {
        "intent": "Query_HomePhone",
        "score": 0.119886041
    },
    {
        "intent": "Query_StartDate",
        "score": 0.09225527
    },
    {
        "intent": "Query_EmpID",
        "score": 0.04686539
    },
    {
        "intent": "Query_Title",
        "score": 0.0423500538
    },
    {
        "intent": "Query_Department",
        "score": 0.028601585
    },
    {
        "intent": "Query_OfficePhone",
        "score": 0.0189168919
    },
    {
        "intent": "Query_UsedVacation",
        "score": 0.0107963076
    },
    {
        "intent": "None",
        "score": 0.0105551314
    },
    {
        "intent": "Query_AnyMeetingToday",
        "score": 0.008343225
    },
    {
        "intent": "Action_GoToCoworkerByName",
        "score": 0.005655013
    },
    {
        "intent": "Query_AccruedSickTime",
        "score": 0.00395378657
    },
    {
        "intent": "Query_Birthday",
        "score": 0.0039028204
    },
    {
        "intent": "Query_UsedSickTime",
        "score": 0.00316411234
    },
    {
        "intent": "Query_CoworkerPhoneExt",
        "score": 0.00306525687
    },
    {
        "intent": "Action_GoToCoworkerByID",
        "score": 0.0018620895
    },
    {
        "intent": "Query_AccruedVacation",
        "score": 0.00123780384
    },
    {
        "intent": "Action_SwipeIn",
        "score": 0.0006449005
    },
```

```
        {
            "intent": "Action_SwipeOut",
            "score": 0.0006220838
        }
    ],
    "entities": [
        {
            "entity": "joe smith",
            "type": "builtin.personName",
            "startIndex": 7,
            "endIndex": 17
        },
        {
            "entity": "joe smith",
            "type": "Pronoun",
            "startIndex": 7,
            "endIndex": 17,
            "resolution": {
                "values": [
                    "she"
                ]
            }
        }
    ],
    ...
}
```

The response includes a subpart including a top scoring intent, Query_ManagerName, which the command interpreter API scores as most likely corresponding to the intent of the user query. The command interpreter API includes a list of other intents and respective scores that the intent module 118 may analyze. For example, in an embodiment, the framework module 122 may use the second, third, etc. highest-scored intents to determine whether the user's intent is different from the top scored intent, or use the results for other purposes. The response also includes one or more entity corresponding to an entity identified by the command interpreter API. The entity may have a type, such as personName. The framework module 122 may analyze the entity and take action based on the entity type.

It should be appreciated that the response may include one or more intent associated with a respective one or more entity. This is an important distinction for some embodiments, such as compound command embodiments wherein a user issues two commands in a single utterance (e.g., "Set account manager to Jim's supervisor and set shipping to overnight"). In such an example, the response may include the identity of Jim's supervisor (e.g., Jill). The response may then return a nested data structure including the two intents ("set account manager" and "set shipping class") and their respective entities ("Jill" and "Overnight").

Each entity in the command interpreter API may be associated with a respective type and a respective set of labeled utterances. For example, a set of entities in the command interpreter API may include a CoworkerID, an EnglishName, a NonEnglishFirstName, a NonEnglishLastName, a NonEnglishName, an OrderNumber, a Pronoun, a personName, etc. Entity types include a regular expression type, a composite type, a simple type, a list type, and a prebuilt type, for example.

Generally, the framework module 122 enables, inter alia, registration of a handler with respect to an object. For example, a user may register a handler for any object, wherein the object is a business object, a GUI element, etc. Providing a link between a voice command and internal enterprise-level business object, which may even be a hidden business object, is an advantage of the present techniques. Once the handler is registered, the event handler 122 receives the forwarded response from the intent module 118, which contains one or more command (e.g., intent) and/or an entity. The event handler 122 processes the command in accordance with the registration performed by the framework module 122.

The ML training module 124 enables the environment 100 to train one or more ML model. For example, the ML training module 124 may include instructions for creating a new model, loading data, labeling data, and performing training operations such as gradient descent, etc. The ML training module 124 may include instructions for serializing a model, and saving the model to a disk (e.g., the memory 114), including any weights associated with the trained ML model. The ML training module 124 may include instructions for cross-validation of a trained model, in addition to instructions for separating data sets into training and validation data sets.

The ML operation module 126 enables the environment 100 to operate ML models trained by the ML training module 126 or another ML training system. The ML operation module includes instructions for loading a serialized model from a disk or a database (e.g., a deserialization instruction), and for initializing the trained ML model with saved weights. The ML operation module may include instructions for communicating an ML operation status to another module.

In an embodiment, the framework 120 and/or event handler 122 may be encapsulated in a voice control hub, which is a self-contained module that can be added to any application, including legacy applications, to add voice functionality. In some embodiments, the framework and/or the voice control hub may be implemented in a programming language/framework such as Microsoft .NET. In some embodiments, the voice control hub and application(s) may execute in a common process space. The voice control hub and application(s) may be implemented in a common technology (e.g., a .NET-compatible technology) or different technologies linked by a distributed computing interface (e.g., a Remote Procedure Call). The voice control hub may implement one or more design pattern (e.g., an object-oriented proxy pattern) that allows an application to implement a voice intent handler to provide natural language understanding to any existing or new application. The framework 120 may include instructions for registering a set of instructions for execution when a particular type of intent (e.g., SWIPE_IN) is received. The voice control hub includes all functionality necessary to access cloud APIs such as the speech-to-text API and command interpreter API discussed above. In this way, the voice control hub links remote cloud API resources to an application in a way that separates the concerns of the application from those of the concerns necessary to access remote APIs. A benefit of such separation of concerns is simplifying development of the application. Another benefit is allowing developers to improve and change the voice control hub without requiring any changes to the application using the voice control hub. Other benefits are envisioned, including allowing the use of newer technologies that may not be directly integrated with legacy applications.

The computing device 102 may include a data store 130, which may be implemented as a relational database management system (RDBMS) in some embodiments. For example, the data store 130 may include one or more structured query language (SQL) database, a NoSQL database, a flat file storage system, or any other suitable data storage system/configuration. In general, the data store 130 allows the computing device 102 to create, retrieve, update, and/or retrieve records relating to performance of the techniques herein. For example, the data store 130 may allow the computing device 102 to retrieve human resources (HR) records relating to an enterprise employee (e.g., an employee's position in an organizational chart). The data store 130 may include a Lightweight Directory Access Protocol (LDAP) directory, in some embodiments. The computing device 102 may include a module (not depicted) including a set of instructions for querying an RDBMS, an LDAP server, etc. In some embodiments, the data store 130 may be located remotely from the computing device 102, in which case the computing device 102 may access the data store 130 via the NIC 112 and the network 104.

The computing device 120 may include an input device 140 and an output device 142. The input device 140 may include any suitable device or devices for receiving input, such as one or more microphone, one or more camera, a hardware keyboard, a hardware mouse, a capacitive touch screen, etc. The output device 142 may include any suitable device for conveying output, such as a hardware speaker, a computer monitor, a touch screen, etc. In some cases, the input device 140 and the output device 142 may be integrated into a single device, such as a touch screen device that accepts user input and displays output.

The computing device 120 may be associated with (e.g., owned/operated by) a company that creates voice-based functionality for the performance of tasks within enterprise business software (e.g., CRM software, QRM software, etc.).

Generally, the cloud 106 may include one or more APIs implemented as endpoints accessible via a web service protocol, such as representational state transfer (REST), Simple Object Access Protocol (SOAP), JavaScript Object Notation (JSON), etc. For example, in an embodiment. The one or more APIs may be implemented as one or more modules including respective sets of computer-executable instructions for performing functions related to voice control of enterprise computing systems. For example, in the depicted embodiment, the cloud 106 includes a speech to text API 150 for transforming speech audio to text and a command interpreter API 152 for analyzing text to determine one or more intent and/or one or more entity.

The cloud 106 may be located at a private data center or a data center owned by a cloud computing provider. The one or more APIs of the cloud 106 may be implemented in virtual machine instances of a cloud provider rented, leased, or otherwise controlled by a corporation controlling the computing device 102. The one or more APIs of the cloud 106 may be implemented within respective computing devices similar to the computing device 102. The cloud 106 may be communicatively coupled to one or more data storage system, such as an RDBMS.

The speech-to-text API 150 is generally configured to receive audio speech data (e.g., WAV or other sound files) from the computing device 102 and to analyze the audio speech data to generate a textual output corresponding to the speech data. For example, audio speech data may be received by the speech-to-text API 150 that includes a recording of an account manager utterance (e.g., the account manager may utter, "Swipe me in."). The speech-to-text API 150 may analyze the account manager utterance to identify a textual output corresponding to the utterance. The textual output may be associated with an identifier of the audio speech data (e.g., a filename or a file path). The textual output may include a string of characters corresponding to the utterance (e.g., "Swipe me in.").

In an embodiment, the speech-to-text API 150 is a custom speech model that is configured to improve the speech-to-text analysis. The custom speech model may allow for the speech-to-text API 150 to filter out background noise and/or to analyze audio speech data that includes speech accents. For example, the speech-to-text API 150 may be an acoustic model that is configured to handle background noise, such as the noise generated by an office environment or other workplace. The speech-to-text API 150 may analyze language to determine examples of common phrases, or snippets, wherein grammar is not emphasized. The speech-to-text API 150 may include pronunciation facilities for identifying jargon or phrases specific to a particular employer environment. For example, in an embodiment, the speech-to-text API 150 may be configured to correctly identify product-specific terms such as an Electronic Data Code ("EDC"), or another product identifier and role-specific terms such as Account Manager ("AM"). The speech-to-text API 150 may be configured to identify both the terms "EDC" and "AM" as well as instances of such terms. For example, the audio speech data may include a recording of a person uttering an instruction to order an item from a particular account manager. The speech-to-text API 150 may generate a textual output: "Order 3 EDC 2154459 for Account 123abc and notify AM Jane Doe". Here, the speech-to-text API 150 is pre-trained to identify EDC and AM as known words in a lexicon. In some embodiments, other words may be added to the lexicon. The speech-to-text API 150 may be implemented using any suitable technologies. For example, in an embodiment, portions of the speech-to-text API 150 are implemented using the Microsoft Bing Speech-to-Text API. The command interpreter 152 of the cloud 106 may analyze the textual output of the speech-to-text API 150 to identify an intent and/or an entity.

The command interpreter 152 is generally configured to receive textual input (e.g., phrases, strings, sentences, textual utterances, etc.) and to analyze the textual input using one or more trained model to generate one or both of an intent and an entity. The one or more trained model may be a machine learning (ML) model for interpreting commands. The ML model may be trained by providing examples of commands that are analyzed during a training phase, wherein the ML model is trained, or learns, to associate inputs with commands/intents. For example, utterances such as "Swipe me in" or "Swipe in" and other variations may be used to train the ML model. Then, given a textual input of "I'd like to swipe in", the command interpreter 152 may generate an intent of "SwipeIn" with a corresponding score of "0.98765", wherein the score represents the model's confidence. The command interpreter 152 may generate an entity of "Person" or "Employee" having a value equal to the identity of the speaker (e.g., the person swiping in). Another application may analyze the output of the command interpreter 152 to perform an action, such as performing a time clock in on behalf of a user.

The command interpreter 152 may use reinforcement learning and/or active learning to periodically update the ML model, so that the command interpreter 152 becomes more accurate over time. For example, an administrator may periodically review utterances that are not understood by the command interpreter 152, and categorize such instances as new training data. The administrator may retrain the model to incorporate the new training data, thereby improving the accuracy of the model. Any suitable technologies may be used to implement the command interpreter 152. For example, in an embodiment, the command interpreter 152 is created using Azure Language Understanding Intelligence Service (LUIS). Because the present techniques use ML techniques, the present techniques are resilient to variations in commands. For example, although the ML model may only be trained using a labeled command of "Set line text to Z", the ML model may understand similar but distinct commands, such as "I'd like to set the line text to Z." Such flexibility in interpretation is advantageous over existing assistant systems, which utilize templates and are therefore brittle, and unable to adapt to natural variations in speech patterns.

In some embodiments, the environment 100 may include more than one command interpreter 152 corresponding to multiple remote applications, or remote modules, each accessed individually by an application executing in the computing device 102. For example, a first command interpreter 152 may be a Cart voice interpreter 152. A second command interpreter 152 may be a GeneralNavigation voice interpreter 152. Additional types of command interpreters are envisioned, such as PowerSearch, CoWorker, Context, etc. Each command interpreter 152 may encapsulate and/or correspond to a trained ML model for interpreting utterances related to a specific type to identify an intent.

In an embodiment, the environment 100 provides two-level natural language understanding via multiple command interpreter modules. For example, the utterance may be run against two or more command interpreter 152, wherein each command interpreter 152 provides a respective score indicating the likelihood that the user's intent corresponds to one of the command interpreters 152. By creating multiple command interpreters 152, the developer is advantageously allowed to train subsets of voice commands by type/topic, rather than requiring the developer to train a monolithic ML model. By separating types of intent into multiple command interpreters 152, the developer can also selectively enable/disable the command interpreters 152, effectively disabling/enabling the set of voice functionality available to a user at any given time.

In operation, a user may create (e.g., by accessing the cloud 106 in a web browser) a remote application in the cloud 106 for grouping one or more intents. Intents may correspond to user imperatives/commands, and may be created by developers and/or users of the environment 100. Intents may correspond to different user imperatives. For example, a user may create a set of page navigation intents: GoToCoworkerByID, GoToCoworkerByName, GoToManagerByName. A user may create a set of intents for performing day work functionality: SwipeIn and SwipeOut. A user may create intents for retrieving information from a worker's personnel records or an organizational chart: AccruedSickTime, AccruedVaction, AnyMeetingToday, Birthday, etc. The user may associate one or more labeled utterances with each intent.

For example, for an intent, "GoToCoworkerByName", the user may associate the following utterances, which may include entities, as denoted using capitalization: "show me information for coworker Pronoun"; "go to coworker joe smiths page"; "show me information for jane doe"; "show me info for PersonName"; "show me information for coworker PersonName"; "show info page"; "show coworker info page for Pronoun"; "show me coworker information for jane doe"; "coworker is PersonName"; "show me information for coworker PersonName". The user may, for each of the foregoing utterances, associate a labeled intent with the utterance. The ML model may then be trained using the labeled utterances, and ambiguous utterances may be labeled to reinforce the model. A list of ambiguous utterances may be displayed, along with a respective label. The user may review the ambiguous utterances, label them, and retrain the ML model, which improves accuracy.

Voice Control of Enterprise Applications

Figure 2:
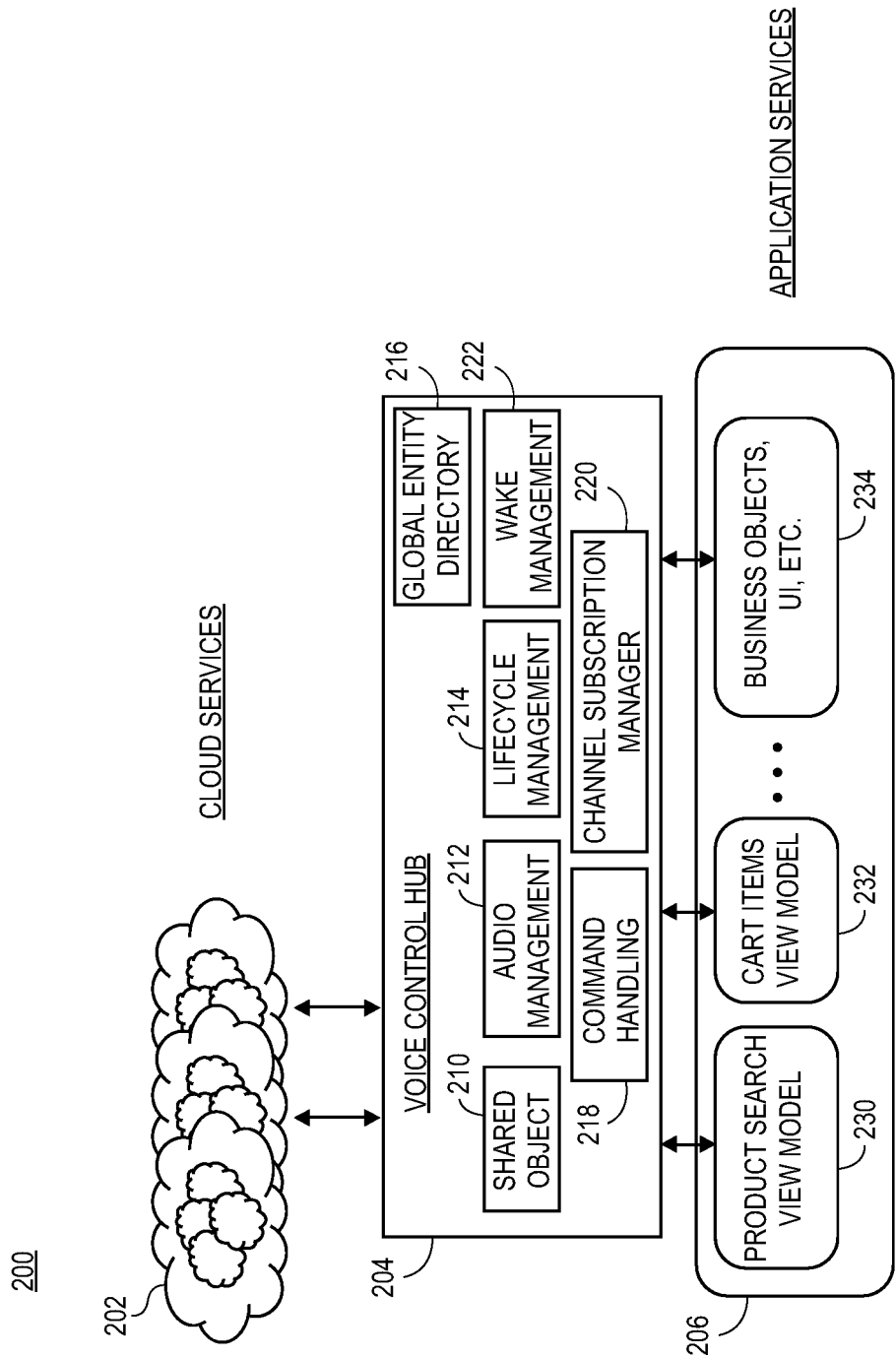
FIG. 2 depicts a conceptual model for voice control of enterprise systems, according to an embodiment.

The operation of environment 100 will now be described with respect to FIG. 2. As seen, FIG. 2 depicts a conceptual model 200 for voice control of enterprise systems and applications, including a cloud services layer 202 and an application 206 that is part of an application services layer and corresponds respectively to the cloud 106 and the computing device 102 of FIG. 1. FIG. 2 also depicts a voice control hub 204 that may act as a bridge or proxy between the cloud services layer 202 and the application 206. The voice control hub 204 may include one or more shared objects 210, an audio management module 212, a lifecycle management module 214, a global entity directory 216, a command handling module 218, a channel subscription manager 220, and a wake management module 222.

The one or more shared objects 210 may be computer-executable libraries that are shared by executable files. A user implementing a voice-enabled application, such as the application 206, may link the application 206 to one or more of the shared objects 210. The shared objects 210 may, in turn, enable the application 206 to access certain functionality provided by the voice control hub 204 via a language-level API. In particular, the voice control hub 204 may be encapsulated as a single shared object library (e.g., a .DLL or .so) that can be deployed to provide turnkey voice capabilities to an existing application. In some embodiments, the voice control hub 204 may be implemented using a programming language such as Java, C-Sharp, etc. The shared library may include one or more modules of the computing device 102, such as the speech-to-text module 116, the intent module 118, the framework module 120, etc. and/or modules of the voice control hub 204.

The audio management module 212 includes events and properties. The events may include a set of events, or state transitions, that are possible in a voice-enabled application. For example, the audio management module 212 may include an OnAudioPlaybackSuccess event, an OnAudioPlaybackDeviceError event, an OnRecordingDeviceError event, an OnMicrophoneStatusChanged event. The voice control hub 204 may capture these events, and others, in response to operating system-level events. The voice control hub 204 may allow a user implementing the voice control hub 204 to register one or more callback function with respect to each event. For example the user may register a callback function to display a message to the user on a screen (e.g., the output device 142 of FIG. 1) when a microphone changes status. The properties of the audio management module 212 may allow the user to retrieve information regarding audio interfaces. For example, the properties may include the current capture device, the current playback device, whether a default recording device is attached, whether an audio initialization failure has occurred, etc. In some embodiments, audio device management is automatic and handled by the operating system, and an application implementing the voice control hub 204 need not explicitly manage hardware. However, the user (e.g., a developer) may find that the ability to access events and properties provides advantageous visibility into audio interfaces that is lacking in other systems.

The lifecycle management module 214 of the voice control hub 204 initializes the voice control hub 204 and provides start and stop functionality. Specifically, the lifecycle management module 214 provides an initialize function, an activate function, and a deactivate function that an application implementing the voice control hub 204 (e.g., the application 206) may call to, respectively, initialize, activate, and deactivate a voice interface.

The global entity directory 216 of the voice control hub 204 may be used by the application 206 to influence how the voice control hub 204 decodes an entity (e.g., the Order-Number entity discussed above) by setting values in a global context visible to a handler object. For example, the application 206 may set a current order number from a global context of the application 206, and the current order number will be visible to an event handler (e.g., the event handler 122). Therefore, the user can programmatically override the entity, which may be otherwise determined via a voice command.

The command handling module 218 of the voice control hub 204 responds to speech audio data (e.g., audio received as input to the input device 140) and translate that audio data into standardized intents/entities. In an embodiment, the command handling module 218 may transmit the voice audio data via a network (e.g., the network 104) to a speech-to-text API in the cloud services layer 202 (e.g., the speech-to-text API 150 of FIG. 1), and receive a response including a textual string corresponding to the speech audio data. The command handling module 218 may then transmit the textual string to a command interpreter API in the cloud services layer 202 (e.g., the command interpreter API 152 of FIG. 1) and retrieve/receive a structured data response including one or more intent and one or more entity, as discussed above. In some embodiments, the speech-to-text API and the command interpreter API may be queried in a single network call to the cloud services layer 202. For example, the environment 100 may include a second computing device 102 to which the audio data is transmitted, wherein the second computing device 102 calls the APIs in the cloud services layer 202 in parallel, collates the responses, and returns a single response to the computing device 102 via the network 104.

In some embodiments, the command handling module 218 may include a set of instructions for implementing multi-turn communication with the user. For example, the user may be utter a "go to power search" command. The user's command may be translated by the command interpreter 152 as an intent (e.g., PageNavigate) and an entity (e.g., PowerSearch). The intent and/or the entity may be included in a predetermined list of multi-turn intents/entities. The command handling module 218 may compare the identified entity (e.g., PowerSearch) to the predetermined list of multi-turn entities. When the identified entity is a multi-turn entity, the command handling module 218 may enter a multi-turn mode, wherein the user is repeatedly prompted to provide information until a condition is met. For example, the predetermined list may be a hash table storing a list of required attributes in association with the identified entity, such that, for example, PowerSearch is associated with fields Name, Date, and Description. The command handling module 218 may successively prompt the user to provide, via voice, a name, a date, and a description. A special command handling function may be created to collect required attributes when the command handling module 218 detects a multi-turn entity. The predetermined list may be stored, for example, in a database such as the data 130.

In some embodiments, the application 206 may establish a context for an intent handler to facilitate multi-turn commands. The context may be established in a first multi-turn handler, and then made available to successive multi-turn handler, so that, for example, a second and third multi-turn handler may access the context to determine which information, if any, is still required of the user.

It should be appreciated that the command handling module 218 may include instructions for role-based permission and security. Authentication information of a user may be passed by an application to the voice control hub 204 each time the user issues a voice command. The command handling module 218 may analyze the authentication information of the user to determine the permission level of the user with respect to data access and command execution. For example, a human resources user may have permissions enabling the user to access personnel records, whereas a sales user may not have such permissions. When the sales user requests salary information of another user, the command module 218 may first determine whether the sales user is authorized to access salary information by consulting a database (e.g., the database 130). If the user is not authorized, the voice control hub 204 may return an error. In some embodiments, initializing the voice control hub 204 may include passing a path to an LDAP resource containing permission information for the users of an organization. Therefore, an advantage of the voice control hub 204 is compatibility with existing security and permission schemes. In some embodiments, the command handling module may blacklist some terms (e.g., a vulgar or an offensive word). For example, the speech-to-text module 116 of FIG. 1 may cross-reference a string of text received from a remote speech-to-text API against a dictionary of blacklisted terms. The intent module 117 of FIG. 1 may perform similar checks, wherein the checks include comparing the access level of the user issuing the command to a list of allowed entities/intents. In an embodiment, the command handling module 218 may log all queries in association with the identity of the authenticated user. For example, the command handling module 218 may store a row in the database 130 for each query issued by the user, along with the ID of the user, and a timestamp. In this way, an audit trail of queries is created for debugging and security purposes.

The channel subscription manager 220 of the voice control hub 204 allows objects inside the application 206 to hook into the voice control hub. From the perspective of an application implementing the voice control hub 204, such as the application 206, the logic and workings of the command handling module 218 are hidden. The application 206 need only register voice handlers that are triggered when a particular intent/entity are received by the voice control hub 204. As discussed below, any application object, of any kind (e.g., a GUI a view model, a business object, etc.) may register handlers and subscribe to a particular channel.

A channel refers to a logical separation between one or more topics (e.g., one or more intents). For example, a user may use instructions provided by the channel subscription manager 220 to subscribe a first application to an action channel for all Action intents. Therefore, any action received by the voice control hub 204 would be routed only to the action channel, and to the first application. Of course, additional applications could subscribe to the same channel, and receive a duplicate notification when the action intent is received in the voice control hub 204. The user could use the instructions to subscribe a second application to a query channel, such that all Query intents would be routed only to the query channel, and the second application (in addition to other applications subscribed to the query channel). In some embodiments, multiple channels may be used to subscribe to intents of the same type (e.g., a first channel subscription to a SwipeIn intent and a second channel subscription to a SwipeOut intent). The channel subscription manager 220 provides the user with the ability to subscribe to intents and/or entities at any level of granularity. The user may subscribe an application to one or more channel by, for example, entering a subscription instruction via an input device. The subscription instruction may be part of the application's code, or a separate module.

The wake management module 222 of the voice control hub 204 allows the voice control hub to be "woken up." The user may awaken the voice control hub 204 via a wake phrase received via a microphone, via a keystroke via a keyboard, etc. For example, the awakening input may be provided to the input device 140 of FIG. 1, and may include any suitable input such as a shaking of a device having an accelerometer, one or more keystrokes, a spoken keyword, etc. The user may set the wake phrase and/or wake key combo via the properties of the wake management module 222. The user may also set the wake mode by choosing between the wake phrase, the key combination, or both. An OnWakeModeChanged event may be triggered any time the wake mode is changed, and the application 206 may detect such events and take action based on such detection (e.g., by displaying a message on an output device).

In some embodiments, the wake management module 222 may process a wake word and following spoken words together. For example, a user may speak a phrase such as, "Who is Joe Smith's manager?". The wake management module 222 may continuously monitor all audio voice data until the wake module 222 encounters the wake word, and the wake management module 222 may capture all words following the wake word as a query. To monitor a wake word contained in audio voice data, the wake management module 222 may transmit the spoken words received from an input device to a speech-to-text API, such as the speech-to-text API 150 of FIG. 1. In some embodiments, monitoring the wake word may include the wake management module 222 analyzing words locally (e.g., in the audio management module 212 of FIG. 2). If the wake mode is configured for a key press wake indication, then the wake management module 222 may listen for a key press event (e.g., a key press emitted by the input device 140 of FIG. 1). By relocating the wake word monitoring to a local machine (e.g., a mobile computing device), the present techniques may advantageously eliminate delay and latency.

In some embodiments, the application 206 may include a timeout period (e.g., a number of seconds) which keeps the voice control hub 204 active. While the user is using the application 206 during the timeout period, no wake word may be required, because the application is continuously active. Therefore, the user may issue voice commands to the application 206 without any need to use a wake word. The always-on capabilities of the present techniques represent an advantage over existing commercial systems which require each command to be prefixed by a particular keyword or phrase.

It should be appreciated that the techniques described herein do not require a wake word or wake up mode. For example, in an embodiment, the voice control hub 204 may continuously listen to the user's speech, and process the audio speech data of the user as a stream of input with an indefinite termination (e.g., no wake/asleep status). Such a mode may be used, for example, to provide a dictation service.

The application 206 may include any number of components, such as one or more view model (e.g., view model 230 and view model 232) in addition to business objects, GUIs, etc. In general, the application 206 is configured to allow a developer to enable voice functionality for the components, as discussed further below.

It should be appreciated that some embodiments may include multiple instances of the application 206. For example, an account manager user may have a first application 206 open on the user's screen throughout the day as the user services the accounts of customers of the enterprise. The first application 206 may be an email application, from which the user reads email messages from customers throughout the day. The account manager user may read an email from a customer requesting that the account manager user create an order for an item. The account manager user may utter, "Create an order from this email." The utterance may be processed as described above, and ultimately, a command handler may create a draft email in a second application 206, filling in context information retrieved from the first application 206. Useful interactions between many different types of applications are envisioned.

Voice-Driven Applications

Figure 3:
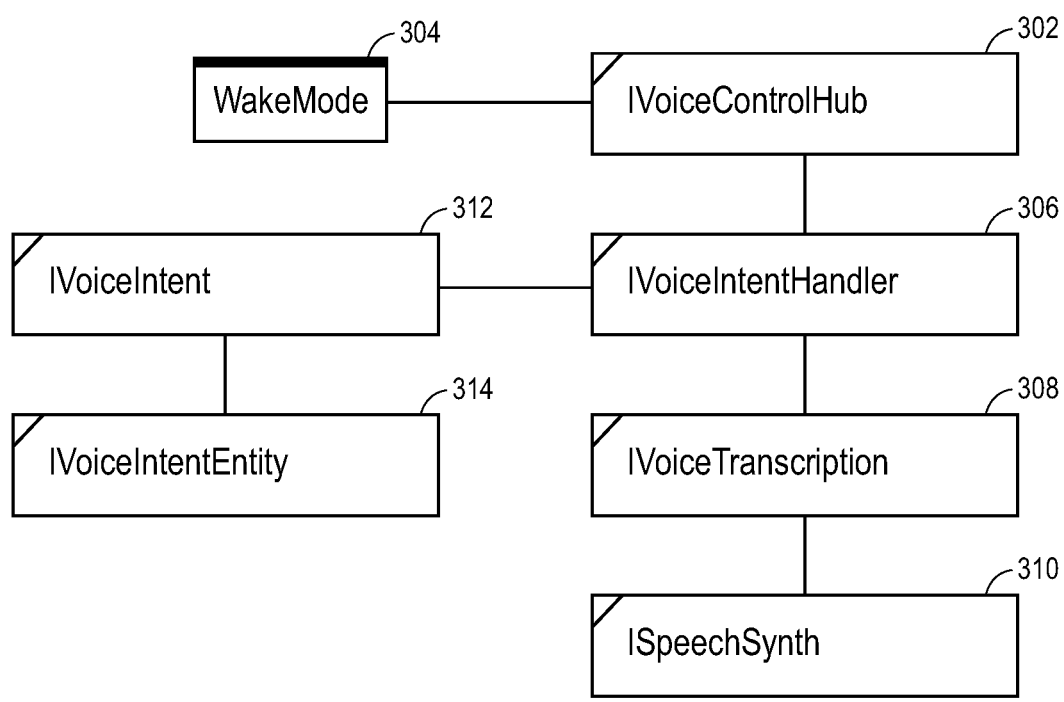
FIG. 3 depicts a schematic class diagram for voice control of an application, according to an embodiment.

The operation of environment 100 will now be described with respect to FIG. 3. As noted above, an application (e.g., the application 206 of FIG. 2) may implement the interfaces/modules of a voice control hub to implement voice-driven functionality, and application objects of any kind may enable voice-driven functionality. FIG. 3 depicts a schematic class diagram 300 illustrating the different aspects of voice control an application may achieve. The class diagram 300 includes a voice control hub class 302 having a wake mode property 304. The voice control hub class 302 may correspond to the voice control hub 204 of FIG. 2, and may be the primary interface into the voice control hub. The voice control hub class 302 may incorporate wake handling, voice channel subscription, and voice request handling request logic. The wake mode property 304 may correspond to the wake mode property of the wake management module 222 of FIG. 2. The voice control hub class 302 may include an intent handler class 306, a voice transcription class 308, and a speech synthesis class 310 which, respectively, provide details for a voice command including raw transcription details and allow the intent handler to generate speech-based responses to a user.

The intent handler class 306 receives notification when a voice command is received/retrieved (e.g., from the cloud 106 of FIG. 1 or the cloud services layer 202 of FIG. 2). The intent handler class 306 may receive notification from the speech-to-text module 116 and/or the intent module 118 of FIG. 1, for example. The class diagram 300 includes a voice intent class 312 and a voice intent entity class 314 that interoperate with the intent handler class 306. The voice intent class 312 handles a voice command that has been decoded into one or more intents and one or more entities. The voice intent class 312 provides the decoded intents and/or entities in a form that a voice handler (e.g., another set of executable instructions) may operate on directly, avoiding the voice handler needing to operate on audio speech data directly. The voice intent entity class 314 represents the one or more entities that were identified from spoken text.

Handler Registration

The application may register the voice intent handler class 306 at any instruction comprising an application (e.g., in a constructor, during initialization, etc.). The application first registers/obtains the voice control hub handler class 302, and then registers a handler object (e.g., a function, a class, a message queue, etc.) that will respond to a voice command. In an embodiment, a form of registration is provided that allows a handler to be automatically unregistered when the handler goes out of scope of the application, which may be advantageous when the lifecycle of the handler is complicated or non-deterministic.

In an embodiment, an intent handler may be a class (e.g., VoiceIntentHandler) that implements a function (e.g., HandleVoiceIntent) that receives one or more argument (e.g., a HandleVoiceIntentArgs argument) that offers additional information and/or functionality. The function may return a boolean value to indicate an execution state of the function. The intent handler may implement the VoiceIntentHandler class 306 of FIG. 3, for example. The argument may expose functions, such as a speech synthesis function. It should be appreciated that the function and class names are provided for exemplary purposes. The intent handler can be named differently, in some scenarios. The intent handler may implement the VoiceIntentHandler class 306 class, which may only require that a single specific function be implemented, wherein that single specific function receives the handler argument/arguments.

The function may perform many tasks related to event handling on behalf of a user's spoken commands. For example, in an embodiment, the function may pass a string argument to the speech synthesis function to cause the speech speech function to speak to the user via an output device (e.g., the output device 142 of FIG. 1). In some embodiments, the output device may be located in a mobile computing device of the user that is a part of the environment 100 and which is linked to the computing device 102 via the network 104. The speech synthesis capabilities of the speech synthesis function may be provided by, for example, the speech synthesis class 310.

In another embodiment, the function may examine the intent name associated with the argument. Specifically, the argument corresponds to the intent included in the user's voice command. When the intent name matches a particular intent type (e.g., SwipeIn), the event handler function may determine then use speech synthesis to notify the user via the output device (e.g., via an audio speaker) that "You have been swiped in.". For example, the speech synthesis class 310 may cause a .WAV file to be played back via the audio speaker. When the user is already swiped in, the function may inform the user via speech synthesis or another method (e.g., a display message on an output display) that, "You are already swiped in." The function may also access any entities included in the user's voice command and perform any desirable analysis (e.g., checking a unit price or dollar value of an OrderItem entity).

In an embodiment, a presenter or view model (e.g., view model 230 of FIG. 2) may implement voice intent handler class 306, in addition to a view model class (e.g., a Windows Presentation Framework View Model). The view model class may implement a Model-View-ViewModel (MVVM) GUI design pattern. Then, the function handling the voice intent may manipulate the ViewModel appropriately by determining the intent name received in the argument. For example, the handler function may set a selected filter pricing list GUI component according to whether the entity corresponds to a landed cost, MSRP, advertised price, or adjusted simulated price. Of course, many more GUI view model adjustments are envisioned. As noted, in some embodiments, the handler function may navigate to a web page within a web site when a particular intent is received. For example, a command such as "Go to Power Search" may be interpreted as a NavigationPowerSearch intent. When the handler receives the intent, the handler may manipulate the ViewModel to display a power search page. It should be appreciated that for programs that include the MVVM pattern, the GUI layer can be changed (e.g., by a backend code update) without disturbing the functionality and capability of the voice-based features. For example, if a Windows Presentation Framework (WPF) user element is modified, voice integration will still function correctly, because the voice functionality is not tied to any particular GUI code or markup language.

As noted above, the function may retrieve information related to an individual's personnel records or an organizational chart. For example, the handler may retrieve a vacation balance, a telephone extension, a manager of a person (e.g., an entity), etc. The handler may use the manager intent and person name entity as a parameter, wherein the personnel database is queried for the manager of the person (e.g., GetManager(personName=joe)). Other parameterized queries are envisioned.

Intent Processing Examples

As noted above, the user may create a set of page navigation intents. The navigation may be according to a page (e.g., Power Search). The user may utter a command, such as "Go to current order of customer." User utterances include, inter alia, order creation ("Create new order for customer Bob Smith."), customer location ("Find a customer matching name"), e-commerce cart creation ("Create a cart"), e-commerce cart use ("Add item EDC number 123456 quantity 2 to cart"), manipulation of line-oriented graphical user interfaces ("Add a new line", "Set line text", etc.), setting a field in an order ("Set note: customer wants ASAP"), order retrieval ("Get current orders"), setting search criteria and querying ("Find keyboard products up to price $200"), inventory lookups ("Find in stock items"), etc. The user may submit forms and perform other GUI actions ("Begin search") using search parameters entered into one or more fields of the GUI by voice. The user may update customer and company representative information ("Change contact to John, email john@example.com. Change account manager to Jeff."). The user may place an order once the order is complete ("Place order").

It should be understood that allowing the user to navigate business processes and applications via voice is in many cases much faster than traditional non-voice user interfaces (e.g., via mouse and keyboard). Using the present techniques, the user may not need to explicitly open any screens or windows within an application. Rather, the user merely speaks the user's intent and the application, which understands the company's business context, performs an appropriate action.

Convolutional Neural Network for Identifying Fields

Manipulation of GUIs using the voice-based features discussed herein may require a component (e.g., the voice intent handler class 306) to have a priori knowledge of an application. In particular, the identifier of a particular GUI widget or component may be required in order for the handler function to reference and update the widget or component. For example, in an HTML setting, a GUI element has a class and/or an ID that can be used to unambiguously obtain a reference to the GUI element. Cascading Style Sheet (CSS) selectors, XPath, etc. are examples of explicitly referencing elements via a unique address.

However, the voice control hub 204 is intended to allow developers and end users to naturally refer to elements of a GUI without coding explicit references, or speaking specific references. For example, a user may state, "update the text box: user wants priority shipping". Requiring the user to know the unique identifier for the notes field would be cumbersome and unworkable at least because such identifiers are often intended to be machine-readable (e.g., a UUID such as 5fda362e-5c76-4867-a9d7-4384b69dc582) and not intended to be user-friendly. While internal control names such as UUIDs may be used in some embodiments, the present techniques include more natural ways for users to reference GUI elements.

Figure 4:
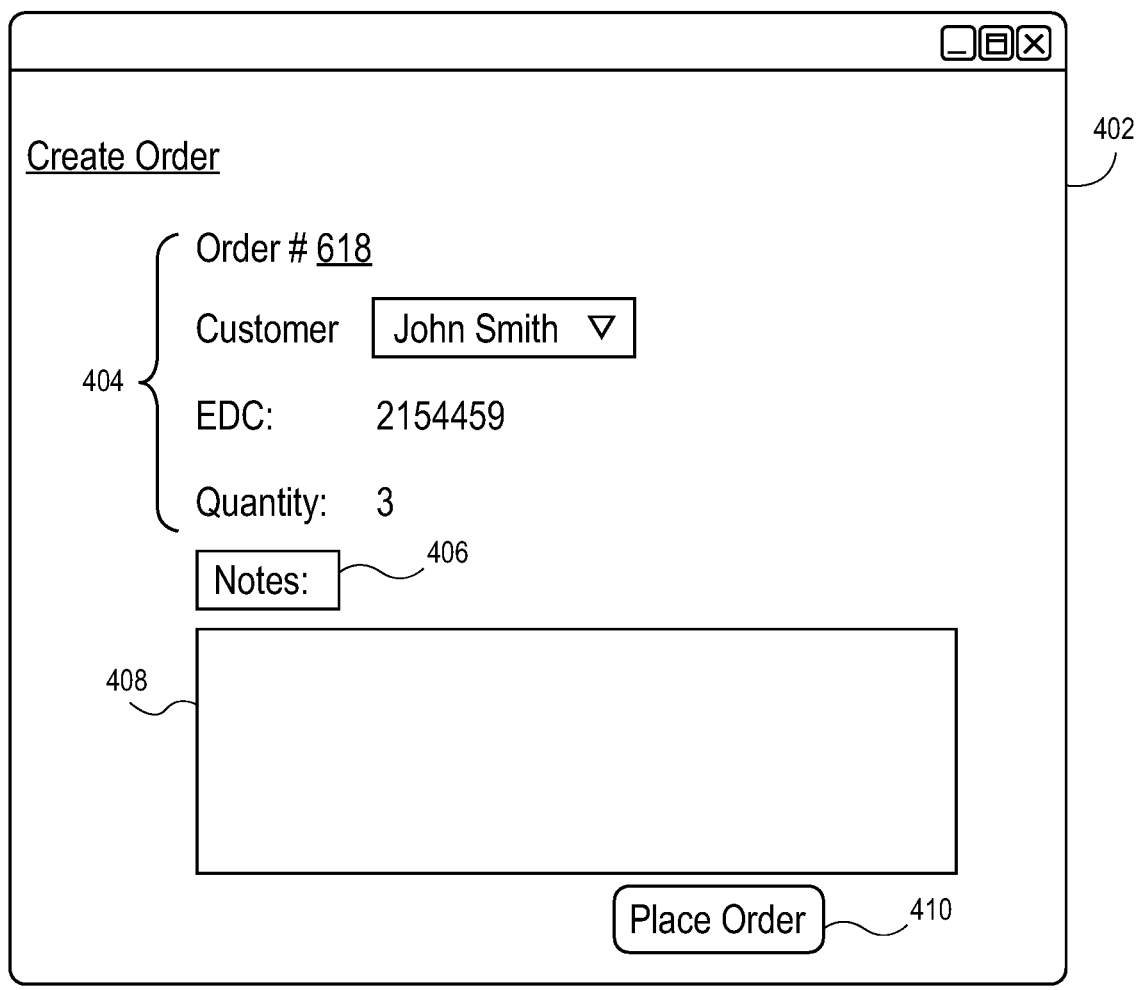
FIG. 4 depicts an example graphical user interface for allowing a user to create an order, according to an embodiment.

Further context will now be provided with reference to FIG. 4. FIG. 4 depicts an example GUI 400. The GUI 400 allows a user (e.g., an account manager) to create an order on behalf of a customer. As noted above, the user can navigate and set the values of a plurality of fields 404. For example, the user may state, "update quantity to 10". The user's utterance may be recorded as speech audio data (e.g., a WAV file) by the input device 140 and received by the framework 120 of the computing device 102 of FIG. 1. The framework may delegate the audio data to the speech-to-text module 116, which may transmit the audio data to the speech-to-text API 150. The framework may receive a response string from the speech-to-text API 150 and submit the string to the command interpreter 152. The intent handler 118 may then receive a structured data set denoting an intent (e.g., "Update") and an associated entity (e.g., Quantity) and an entity parameter (e.g., 10). The framework 120, and/or the command handling module 218 of the voice control hub 204 of FIG. 2, may dispatch the intent, entity, and entity parameter to a handler function. The handler function may be one that is subscribed to quantity events. For example, the user may have previously registered a handler for intents/entities of a particular type (e.g., quantity entities) via the channel subscription manager module 220 of FIG. 2. Therefore, the quantity entity is sent to a particular quantity handling function, as discussed with respect to the voice intent handler class 306 of FIG. 3.

In some embodiments, the handling function may include a reference to the field in the plurality of fields 404 (e.g., the quantity). In other embodiments, the handling function may access a pre-determined mapping of entities to fields to obtain a reference to the appropriate GUI component.

In other embodiments, the quantity handling function may call a trained ML model, passing the entity as a parameter, wherein the trained ML model analyzes the entity parameter, and the GUI 400, to generate a reference to the appropriate field.

The trained ML model may be may be a CNN that is trained to analyze labeled digital images, wherein the labeled digital images depict GUI elements with associated component labels. Using a CNN to identify which field is associated with a label allows mapping to use screen text and not internal control names. For example, as in FIG. 4, a notes field component has a component label 406 and an input field 408. The CNN may be trained using a set of tuples, wherein the first element is a description of the element (e.g., "text box") and the second element is an image of the input field 408. Other component types and labels may be included in the training data set. The CNN may be trained to identify GUI controls based on a description of those controls.

Figure 5:
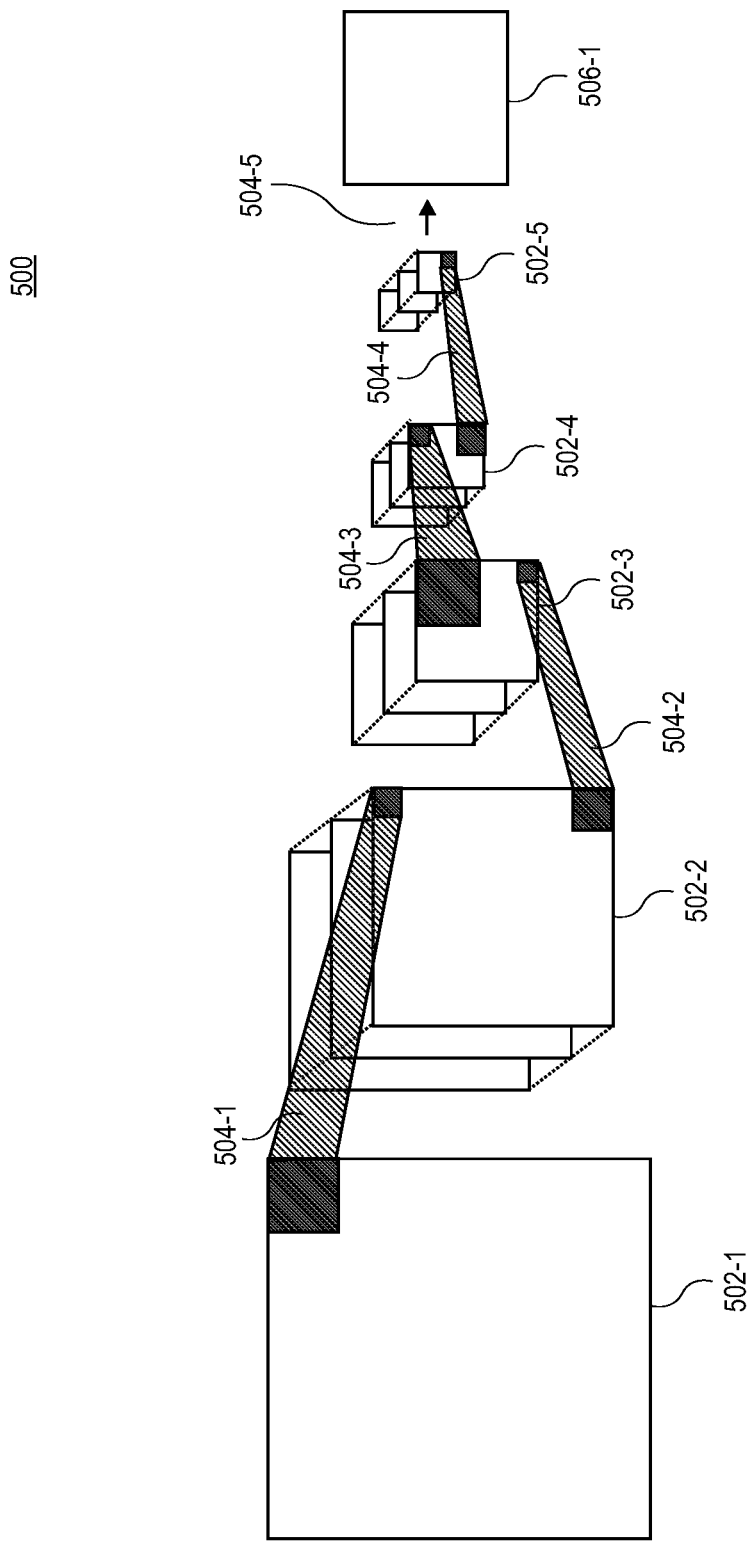
FIG. 5 depicts an example convolutional neural network, according to an embodiment.

For example, FIG. 5 depicts a CNN 500, including an image 502-1. The image 502-1 may be represented using a three-dimensional tensor including raw pixels of the image 502-1 and three color channels (red, green, and blue). The image 502-1 may be analyzed by a first convolution operation 504-1 which scans the image 502-1 using a filter to produce a stack of activation maps 502-2, wherein one activation layer is created for each filter. The filter may downsample or otherwise manipulate the image 502-1. A second convolution operation 504-2 may produce a second activation map 502-3, and a third convolution operation 504-3 may generate a third feature map 502-4, and a fourth convolution operation 504-4 may generate a fourth feature map 502-5. Any suitable number of convolution operations may be used. Finally, a fully-connected layer 504-5 may generate an output 506-1. Depending on the training modality, the output 506-1 may be a pixel location, a reference to the GUI object, etc.

The CNN 500 may be trained to identify particular components (e.g., the text box 408). In an embodiment, the output 506-1 may be a pixel height and pixel width representing the bottom left corner of the desired HTML element. In some embodiments, the output 506-1 may be a reference to an object in memory (e.g., a pointer address to a GUI element). In another embodiment, the output 506-1 may represent coordinates for a bounded box around the desired element. In some embodiments, the CNN 500 may also identify GUI controls based on nearby textual labels, in addition to the control type. For example, the CNN 500 may identify a GUI control based on a description of its data (e.g., "the quantity field") or its type (e.g., "the input field"). The application using the CNN for identification may employ multi-turn communication, as discussed herein, to disambiguate user queries (e.g., in an application having multiple input fields).

Once the CNN 500 is trained, a screen capture (e.g., a screen shot) of the GUI 400 may be passed to the CNN 500, along with a description of a sought element (e.g., "text box"). The CNN 500 then outputs the location of the desired element with respect to the screen capture. An application (e.g., the application 206 of FIG. 2) may then use the output 506-1 to locate the desired element in the GUI 400. It should be appreciated that the screen shot may be of any application (e.g., a PDF file, an image, a web page, etc.).

Therefore, continuing the above examples, when the user states "update the text box: user wants priority shipping", the application may call the CNN, passing an entity (e.g., "text box") and a screen capture of the current GUI screen as parameters. The CNN convolves the screen capture and the entity input, returning an identifier (e.g., a path, a reference, a pixel location, etc.) to the application. The application may then use the identifier to manipulate the identified GUI control by changing the control, editing its content (e.g., "user wants priority shipping"), etc. As above, the application may analyze the intent to determine an operation to perform (e.g., an update, a delete, an addition, etc.).

Fuzzy Matching

Sometimes, a user's utterance may include an entity name that is not exact, even if an exact name is included on a GUI. For example, the Customer dropdown box in the plurality of fields 404 may include the name Joseph Jones. If a user's voice command includes, "set customer to joe jones", the intent may be an UpdateCustomer intent and the entity may be "Joe Jones". An intent handler for performing an update of the customer dropdown element may include a set of instructions for determining whether the named entity (e.g., Joe Jones) is found in the GUI control, and if not, for performing a fuzzy match. The fuzzy match may include using a string distance function, a longest common subsequence algorithm, the Levenshtein distance algorithm, a Soundex/soundex-like function, etc. The fuzzy match may include analyzing a custom element such as the starting initials of words, and/or permutations of word ordering. Therefore, names, products, etc. need not be exactly uttered by a user, and yet the handling function will still correctly carry out the user's intent.

Dynamic Handler Compilation

Figure 6:
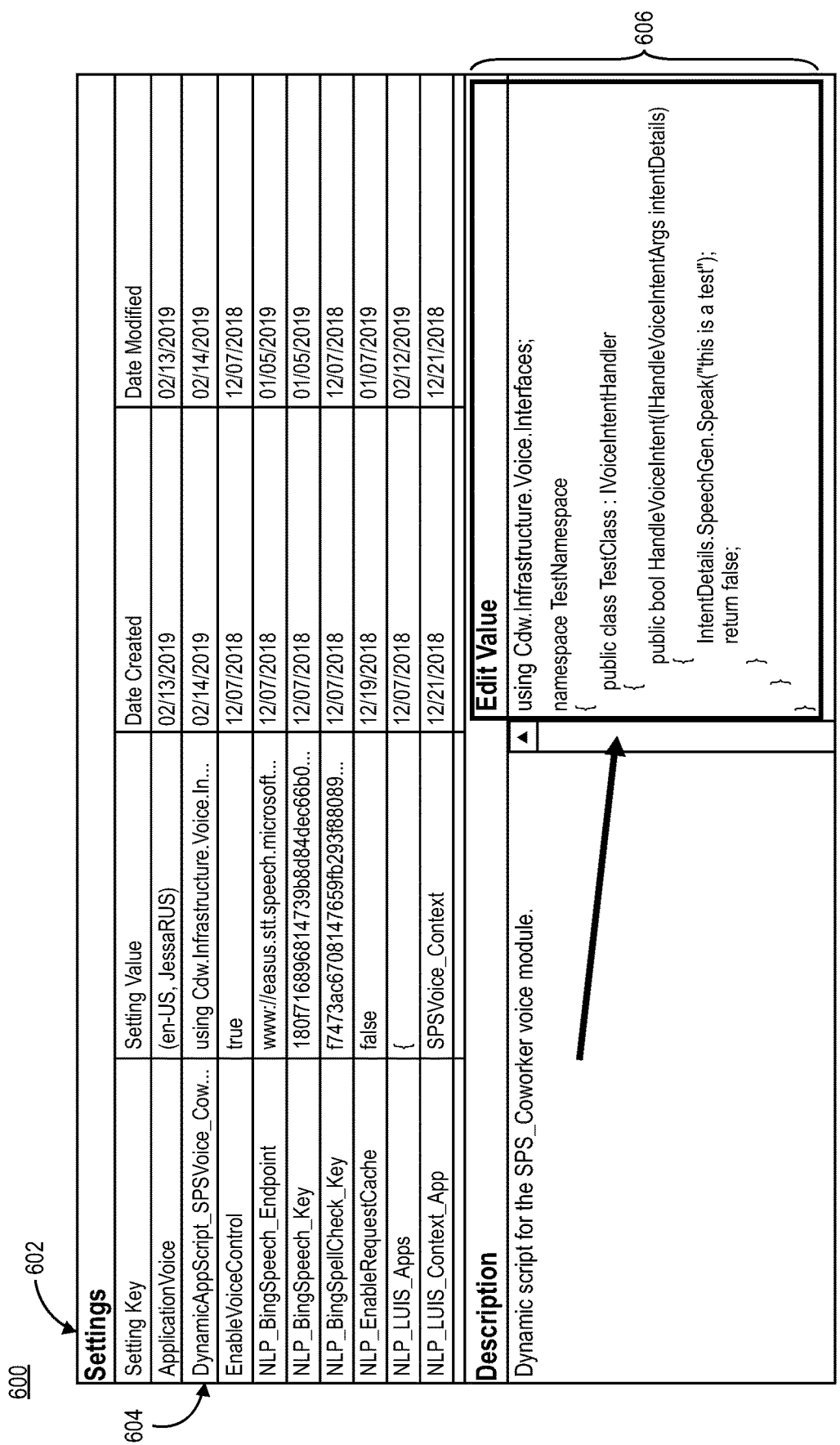
FIG. 6 depicts an example graphical user interface for setting a dynamically-compiled handler, according to an embodiment.

Voice applications are sensitive to latency. A human used to conversing with another human may find delays in response from a computer voice application frustrating and unnatural. The present techniques include dynamic compilation of handlers, which results in several benefits. First, dynamic compilation results in performance gains during program execution. Rather than compiling code during runtime when the user is waiting for a response, code is compiled when the application initializes, and merely executed at runtime. FIG. 6 depicts an example GUI 600 for setting a dynamically-compiled handler. The GUI 600 includes a settings menu 602 including a plurality of setting keys, each having a respective setting value, creation date, and modification date.

The settings menu 602 includes a dynamic compilation key 604. When the user clicks on the dynamic compilation key 604, the user is provided with the value associated with the dynamic compilation key 604 in an edit value box 606. At any time, the user may modify the handler in the edit value box 606, and the application with which the handler is associated (e.g., the application 206) will recompile the updated handler and use it for voice control operations as discussed with FIG. 3. The depicted handler function in the edit value box 606 may correspond to, for example, the handler function for updating quantity discussed above with respect to FIG. 4, the HandleVoiceIntent function discussed with respect to FIG. 3, etc.

In addition to providing a more responsive runtime performance, another benefit of the dynamic compilation aspect of the present techniques is that handler functions may be edited while the application is deployed in a production environment without requiring a redeployment. Thus, the dynamic compilation aspects are useful to programmers by reducing computational resources required for operating enterprise environment deployments, simplifying developer workflow, and allowing the developer to debug in a real-world computing environment, such as the computing environment 100. Further, in the event of a software bug in a handler, or a change in business requirements, the developer can agilely update the handler code without performing a redeployment.

Visual Programming for Intent Dispatch

As noted above, conventional voice systems require developers to write code to implement functionality, and as such, do not allow end users to add voice commands. The present techniques overcome these limitations using, inter alia, the voice intent recognition, RPA, computer vision, and dynamic compilation techniques discussed herein. Specifically, the present techniques include voice integration using an action palette, wherein an end user (e.g., a business person) can map voice intents to actions to create custom voice-driven behaviors, without writing any code.

Figure 7:
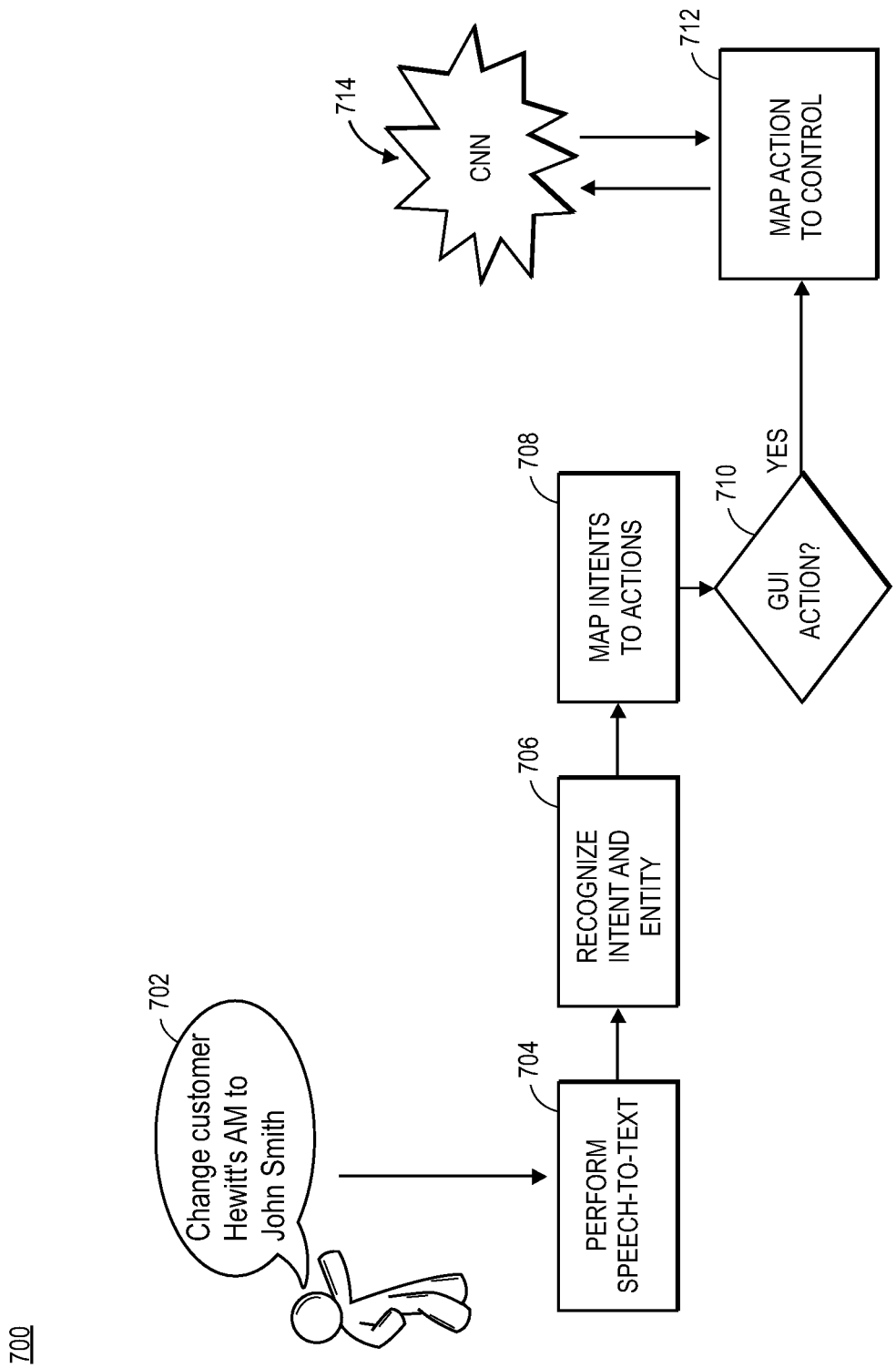
FIG. 7 depicts a flow diagram of a method of visual programming for intent dispatch, according to one embodiment and scenario.

FIG. 7 depicts a flow diagram of a method 700 of visual programming for intent dispatch. The method 700 includes performing a speech-to-text operation on an utterance 702 (block 704). The speech-to-text operation at block 704 may be performed by, for example, the speech-to-text API 150 of FIG. 1. The speech-to-text operation at block 704 may generate a text string that is analyzed to recognize one or more intent and one or more respective entity (block 706). The entity and intent recognition may be performed by, for example, the command interpreter 152 of FIG. 1. The intent and entity may be mapped to one or more actions (block 708).

The method 700 may include determining whether an action involves a GUI (block 710). When one of the one or more actions is a GUI action, the method 700 may include mapping an action to a control (block 712). In some embodiments, mapping an intent or action to a control may use internal control names, as discussed above. However, in some embodiments, a CNN 714 may be used for mapping. The CNN 714 may correspond to the CNN 500 of FIG. 5, for example.

Action Palette

Figure 8:
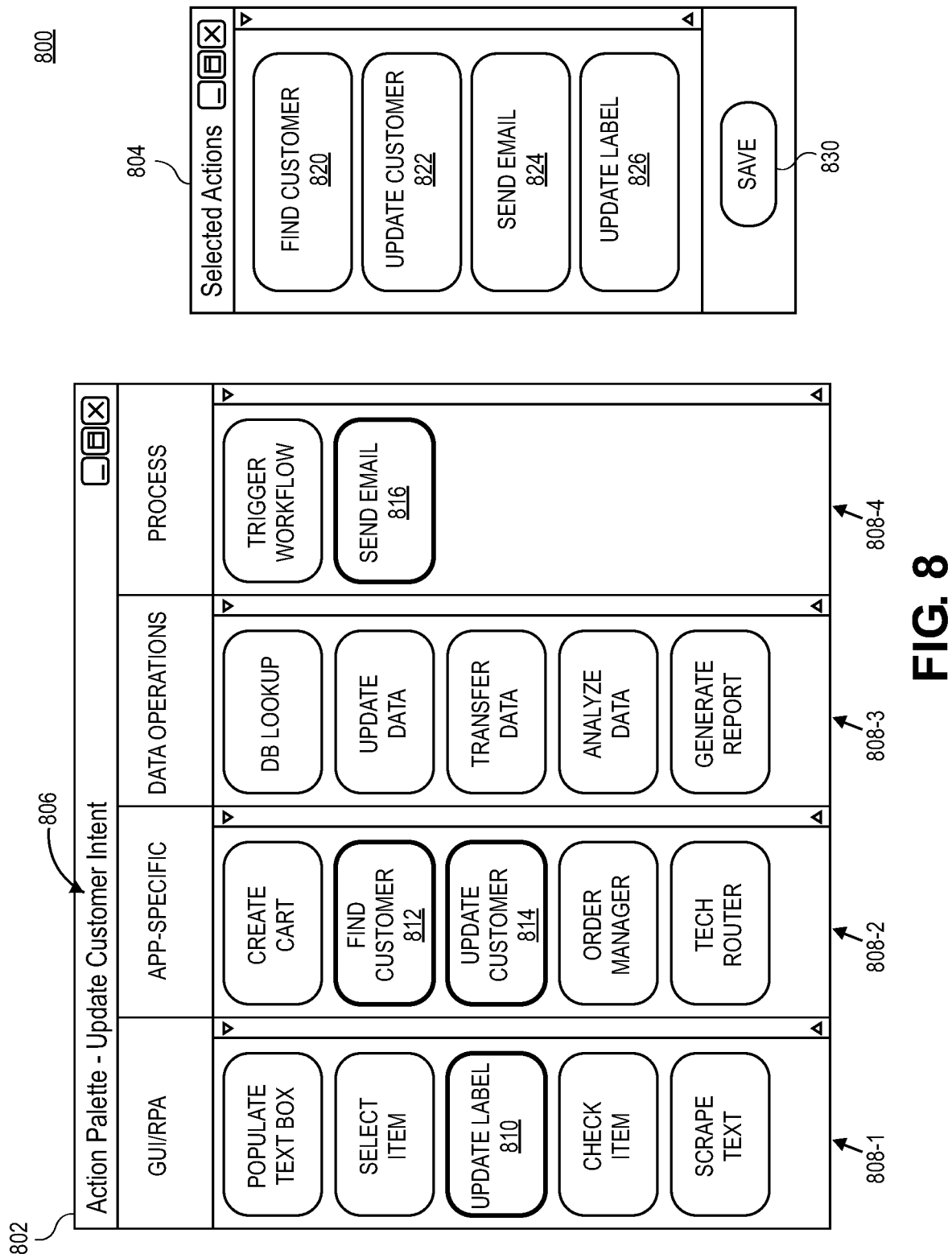
FIG. 8 depicts an action palette graphical user interface, according to an embodiment.

In some embodiments, the mapping of intents/entities to one or more actions at block 708 may be enabled by a mapping created by a user using an action palette tool. As seen in FIG. 8, an action palette GUI 800 includes a first window 802 and a second window 804 that includes one or more selected actions.

The first window 802 is an action palette menu, corresponding to an intent 806. For example, the intent 806 may relate to the utterance 702 of FIG. 7 and may have been detected by the intent/entity analysis at block 706 of FIG. 7. The first window 802 includes a set of actions 808-1, which may include GUI-based actions for performing RPA, in some embodiments. The first window 802 includes a set of actions 808-2, which may relate to a specific application, such as the application 206 of FIG. 2. The first window 802 includes a set of actions 808-3, which may include data operations that access a database, such as the database 130 of FIG. 1. The first window 802 includes a set of actions 808-4, which are process actions, such as sending an email. A user may select any of the actions listed in the set of actions 808-1 through 808-4, to associate those actions with the intent 806.

The actions in the set of actions 808-1 through 808-4 may be created, edited, and deleted by a user, such as an administrator or a business user. The actions may be shared among users. For example, a first business user may create a new action to automate a particularly repetitive or tiresome task. The GUI 800 may include instructions that allow the first user to share the action with a second business user, so that the second business user can use the action to automate the same task.

When the user selects an action, the GUI 800 may add the selected action to a list of selected actions in the second window 804. The GUI 800 may also allow the user to drag an action from the first window 802 to the second window 804 to select the action. The user may reorder the selected actions in the second window 804 via drag and drop. Specifically, in the depicted example, the user has selected an update label action 810, a find customer action 812, an update customer action 814, and a send email action 816. These actions compose the set of actions that will be performed in response to the intent 806. The user has ordered the actions in the second window 804, such that the first action performed is a find customer action 820, corresponding to the find customer action 812, the second action performed is an update customer action 822, corresponding to the update customer action 814, the third action performed is a send email action 824, corresponding to the send email action 816, and the fourth action performed is the update label action 826, corresponding to the update label action 810.

Once the user is satisfied with the selected actions, and their ordering, the user may activate a save button 830 of the second window 804. The GUI may include instructions for saving the selected actions in association with the customer intent in the database 130. In operation, when a handler function receives an intent matching the intent 806 (e.g., UpdateCustomer), the handler function may query the database 130 to select the set of selected actions associated with the intent 806. The handler function may then execute each of the selected actions in the order established by the user in the second window 804.

It should be appreciated that the action palette GUI 800 of FIG. 8 harnesses the voice processing and intent determination techniques disclosed herein to provide an intuitive way for a user, including a non-technical user, to create new actions and map those actions to intents. The GUI 800 may have additional features and functionality, such as a wizard that walks the user through the process of adding a new voice-enabled command, and associating that command with an action.

In some embodiments, a dynamic descriptor may be used to map intents to actions. For example, once an intent is determined, it may be advantageous to allow multiple GUI controls to be updated.

```
<intent name="Keyword">
<action type='populateTextBox' controlLabel=KEY-
    WORDS>
<source entity=Keyword singularize=true>
</action>
<action type='selectItem' controlLabel=COMPANY>
<source entity=CompanyCode>
</action>
<action type='populateTextBox' controlLabel=FROM>
<source entity=PriceFrom>
</action>
<action type='populateTextBox' controlLabel=TO>
<source entity=PriceTo>
</action>
</intent>
```

In the above example, the descriptor results in the population of multiple control elements. It should be appreciated that the descriptor follows screen labels, not internal names. Therefore, dynamic descriptors may be used to allow users to create their own functionality using natural names of screen components.

Further, it may be advantageous to perform a lookup in a database and to populate a GUI control based on a fuzzy match. A dynamic descriptor may be created as follows:

```
<intent name="CustomerName">
<action type='populateTextBox' controlLabel=CUST-
    OMER>
<source entity=CustomerName>
<lookup source=CustomerStore fuzzy=true>
</action>
</intent>
```

In the above example, the descriptor specifies that the customer name will be retrieved from customer database and, via fuzzy matching, the customer dropdown will be populated with the retrieved value. The dynamic descriptors may be dynamically compiled at runtime and stored, for example, in the settings menu 602 of FIG. 6.

In particular, a dynamic descriptor may be compiled and inserted into the intent listener chain. The descriptor may be changed freely to change/extend/correct behaviors. The descriptor may be invoked by an intent handler when the intent (e.g., CustomerName) matches the descriptor. The compiled descriptor may be registered with a handler function and accessed from within the handler function in the context of processing an intent argument. It should be appreciated that the functionality implemented using dynamic descriptors could be implemented using other programming techniques.

For example, rather than using a descriptive markup language to specify a mapping between intents and actions, a programmer could write explicit code (e.g., using a series of IF . . . THEN statements). However, such code would result in a series of steps to be taken. By rather describing data to be matched, and processing required, the present techniques allow data and functionality to be decoupled. Therefore, the functionality can be updated by modifying the descriptor without requiring any changes to the data (e.g., the intent/entity).

Figure 9:
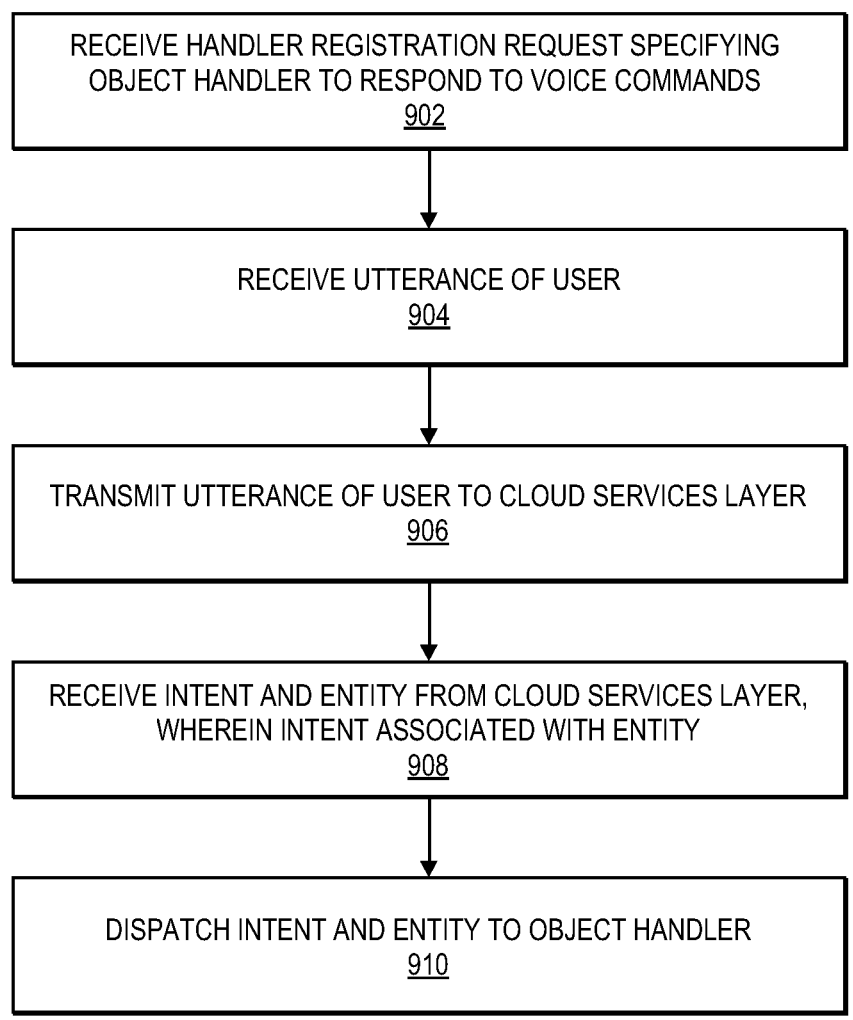
FIG. 9 depicts an example flow diagram of a method for enabling voice functionality in an application, according to an embodiment.

FIG. 9 depicts an example flow diagram of a method 900 for enabling voice functionality in an application, according to an embodiment. The method 900 may include receiving a handler registration request specifying an object handler to respond to voice commands (block 902). For example, an application such as the application 206 may access a class library including the classes depicted in the class diagram 300 of FIG. 3. The application may implement the IVoiceControlHub class 302 to access wake handling, voice channel subscription, and voice request handling. The application may set the wake mode (e.g. a wake word or keystroke combination) using the wake mode property 304. The application may implement the IVoiceIntentHandler class 306 to receive notifications when a command arrives that is relevant (e.g., a command matching a desired intent). The application may implement the IVoiceIntent class 312 to process intent and entity information. The application may represent intents and entities using the IVoiceIntentEntity class 314. The application may implement the IVoiceTranscription class 308 to access details for a voice command containing raw transcription details, and may implement the ISpeechSynth class 310 to generate speech-based responses to the user. The application may register a voice handler anywhere in the application, or in the constructor/initialization code of any object. A RegisterIntentHandler function allows the application to register an object (e.g., a function) that will respond to voice commands. In some embodiments, the method 900 compiles the object handler as a dynamic function.

As discussed above, the registered object may receive arguments including a reference to the user, an intent, an entity, etc. The registered object may inspect properties of the received object (e.g., an entity name) and take actions based on the inspected properties, such as modifying the status of a user record (e.g., a time clock), receiving user information from a database, such as a human resources database (e.g., a user's vacation balance, manager identity, etc.), updating the status of a GUI, navigating a page, accessing another application (e.g., sending an email), etc. It should be appreciated that the intent handler can perform any suitable action. It should also be appreciated that as discussed above, the intent handler may have access to a global context allowing the intent handler to preserve a state of the application over time. By preserving state, the intent handler may implement multi-turn interactions and other actions requiring information to be shared among multiple intent handlers. As discussed, the present techniques support dynamic compilation of handlers at runtime to improve performance and allow functionality to be edited at runtime, as discussed with respect to FIG. 6. The method 900 may include providing one or more of the classes of FIG. 4 as shared objects, for example, via the shared object module 210 of FIG. 2.

The method 900 may include receiving an utterance of a user (block 904). The utterance may be received via an input device coupled to a device that the application is executing in. For example, the input device may correspond to the input device 140 of FIG. 1. The input device may be a microphone that is integral to a device (e.g., a mobile computing device of the user) or a wired or wireless microphone attached to a stationary device such as a desktop computer. The method 900 may include performing audio management functions to make the input device available and to read data from the device. For example, the method 900 may (e.g., using the audio management module 212 of FIG. 2) initialize the audio device, load a software driver, query properties of the device, and process other events/properties of the device, as discussed herein. The method 900 may store an audio file of the received utterance (e.g., a WAV file, an MP3 file, etc.) in a storage device, such as the database 130 or the memory 114 of FIG. 1.

In an embodiment, the method 900 includes continually recording audio data from an environment, and continuously converting the audio data to text via speech-to-text functionality. The method 900 may continually analyze the text until a wake word is found. Then, in response to the presence of the wake word, any successive utterances may be interpreted as a command, and utterances prior to the wake word may be discarded or temporarily stored for later analysis. In another embodiment, the method 900 may record audio data of an utterance in response to a key press.

The method 900 may include transmitting the utterance of the user to a remote cloud services layer (block 906). For example, the method 900 may use the NIC 112 to transmit the utterance via the network 104 to the cloud 106 of FIG. 1 or the cloud services layer 202 of FIG. 2. Specifically, the command handling module 218 of FIG. 2 may submit an HTTP POST request including the audio data of the utterance as a payload to an API, such as the speech-to-text 150 of FIG. 1. In an embodiment, the API may be an API of an intermediate server located in the cloud that acts as a proxy or reverse proxy between the cloud and the voice control hub 204.

The method 900 may include receiving or retrieving an intent and an entity from the remote cloud services layer, wherein the intent is associated with the entity (block 908). For example, as discussed above, the command handling module 218 may receive a JSON response from the cloud (e.g., the command interpreter 152) that includes one or more intent, wherein each intent is associated with one or more entities.

The method 900 may include dispatching the intent and the entity to the object handler (block 910). In some embodiments, the method 900 may dispatch every intent/entity received to each registered event handler. In some embodiments, the method 900 may dispatch the intent/entity received only to those event handlers subscribed to a channel associated with the intent and/or entity. The method 900 may also store the intent/entity in a database, such as the database 130 of FIG. 1. It should be appreciated that dispatching the intent and entity may include the method 900 transferring the intent/entity to another computing device, in some cases, via an electronic network.

In an embodiment, the method 900 receives a channel subscription specifying a channel and one or both of (i) an intent type, and (ii) an entity type. The method 900 stores channel subscription information (e.g., the channel name, a socket a socket address of the subscriber, etc.) in a database. Subsequently, when an intent/entity is received/retrieved, the method 900 dispatches the intent and entity to the channel based on the channel subscription information.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A voice control hub computing system for performing a task within an enterprise business software application, comprising one or more processors, and a memory containing instructions that, when executed, cause the voice control hub computing system to: receive a handler registration request specifying an object handler to respond to voice commands; receive an utterance of a user of the enterprise business software application; transmit the utterance of the user to a remote cloud services layer; convert the utterance of the user to a text string representing speech-to-text output using a custom speech model; analyze the text string using one or more trained machine learning models to generate an intent and an entity corresponding to the task, wherein each of the models is trained using a respective command interpreter for interpreting utterances of a respective type; receive the intent and the entity from the remote cloud services layer, wherein the intent is associated with the entity; and dispatch the intent and the entity to the object handler.

2. The voice control hub computing system of aspect 1, including further instructions that, when executed, cause the voice control hub to: receive a text string representing speech-to-text output from the remote cloud services layer.

3. The voice control hub computing system of aspect 1, including further instructions that, when executed, cause the voice control hub to: receive a channel subscription specifying a channel and one or both of (i) an intent type, and (ii) an entity type, and based on the channel subscription, dispatch the intent and the entity to the channel.

4. The voice control hub computing system of any one of aspects 1 through 3, wherein the object handler is a dynamically compiled function.

5. The voice control hub computing system of any one of aspects 1 through 4, wherein the utterance of the user is received in response to a wake word utterance of the user.

6. The voice control hub computing system of aspect 1, including further instructions that, when executed, cause the voice control hub to: synthesize a speech response to the user responsive to the utterance of the user, and cause the speech response to be output in an audio speaker of a computing device of the user.

7. The voice control hub computing system of aspect 1, including further instructions that, when executed, cause the voice control hub to: set a value in a global context visible to the object handler.

8. The voice control hub computing system of any one of aspects 1 through 7, wherein the voice control hub computing system is packaged as a shared object that an application can access to enable voice functionality in the application.

9. A computer-implemented method for enabling voice functionality in an enterprise business software application, comprising: receiving a handler registration request specifying an object handler to respond to voice commands; receiving an utterance of a user of the enterprise business software application; transmitting the utterance of the user to a remote cloud services layer; converting the utterance of the user to a text string representing speech-to-text output using a custom speech model; analyzing the text string using one or more trained machine learning models to generate an intent and an entity corresponding to a task, wherein each of the models is trained using a respective command interpreter for interpreting utterances of a respective type; receiving the intent and the entity from the remote cloud services layer, wherein the intent is associated with the entity; and dispatching the intent and the entity to the object handler.

10. The computer-implemented method of aspect 9, further comprising: receiving a text string representing speech-to-text output from the remote cloud services layer.

11. The computer-implemented method of aspect 9, further comprising: receiving a channel subscription specifying a channel and one or both of (i) an intent type, and (ii) an entity type, and based on the channel subscription, dispatching the intent and the entity to the channel.

12. The computer-implemented method of aspect 9, further comprising: compiling the object handler as a dynamic function.

13. The computer-implemented method of aspect 9, further comprising: receiving utterance of the user in response to the user uttering a wake word.

14. The computer-implemented method of aspect 9, further comprising: synthesizing a speech response to the user responsive to the utterance of the user, and causing the speech response to be output in an audio speaker of a computing device of the user.

15. The computer-implemented method of any one of aspects 9 through 14, wherein synthesizing the speech response to the user responsive to the utterance to the user is part of a multi-turn interaction with the user.

16. A non-transitory computer readable medium containing program instructions that when executed, cause a computer to: receive a handler registration request specifying an object handler to respond to voice commands; receive an utterance of a user of the enterprise business software application; transmit the utterance of the user to a remote cloud services layer; convert the utterance of the user to a text string representing speech-to-text output using a custom speech model; analyze the text string using one or more trained machine learning models to generate an intent and an entity corresponding to a task, wherein each of the models is trained using a respective command interpreter for interpreting utterances of a respective type; receive the intent and the entity from the remote cloud services layer, wherein the intent is associated with the entity; and dispatch the intent and the entity to the object handler.

17. The non-transitory computer readable medium of aspect 16 containing further program instructions that when executed, cause a computer to: receive a text string representing speech-to-text output from the remote cloud services layer.

18. The non-transitory computer readable medium of aspect 16 containing further program instructions that when executed, cause a computer to: receive a channel subscription specifying a channel and one or both of (i) an intent type, and (ii) an entity type, and based on the channel subscription, dispatch the intent and the entity to the channel.

19. The non-transitory computer readable medium of aspect 16 containing further program instructions that when executed, cause a computer to: synthesize a speech response to the user responsive to the utterance of the user, and cause the speech response to be output in an audio speaker of a computing device of the user.

20. The non-transitory computer readable medium of aspect 16 containing further program instructions that when executed, cause a computer to: set a value in a global context visible to the object handler.

Additional Considerations

The above voice-enabled functionality works in any application context. There is no need for a user to enter a particular dictation mode context, as with a conventional speech recognition program, although the methods and systems do support an explicit dictation context. The above techniques allow a user to enter a voice recognition mode concurrently with another task, such as editing an email, or seamlessly navigating from one application to another.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A voice control hub computing system for performing a task within an enterprise business software application, comprising:
   one or more processors, and
   a memory containing instructions that, when executed, cause the voice control hub computing system to:
      receive a handler registration request specifying a dynamic object handler to respond to voice commands, wherein the dynamic object handler is compiled when the application initializes;
      receive an utterance of a user of the enterprise business software application;
      transmit the utterance of the user to a remote cloud services layer;
      convert the utterance of the user to a text string representing speech-to-text output using a custom speech model, wherein the custom speech model filters out background noise from the utterance of the user;
      analyze the text string using one or more trained machine learning models to generate an intent and an entity corresponding to the task,
         wherein at least one of the models is trained using a respective command interpreter for interpreting utterances of a respective type, and at least one of the models is a convolutional neural network trained to map intents to graphical user interface components;
      receive the intent and the entity from the remote cloud services layer, wherein the intent is associated with the entity;
      dispatch the intent and the entity to the dynamic object handler; and
      analyze the intent, the entity, and an image of a graphical user interface using at least one of the one or more trained machine learning models to map the entity to a component of the graphical user interface corresponding to performance of the task.

2. The voice control hub computing system of claim 1, including further instructions that, when executed, cause the voice control hub computing system to:
   receive the text string representing speech-to-text output from the remote cloud services layer.

3. The voice control hub computing system of claim 1, including further instructions that, when executed, cause the voice control hub computing system to:
   receive a channel subscription specifying a channel and one or both of (i) the intent type, and (ii) the entity type; and
   based on the channel subscription, dispatch the intent and the entity to the channel.

4. The voice control hub computing system of claim 1, wherein the dynamic object handler is a dynamically compiled function.

5. The voice control hub computing system of claim 1, wherein the utterance of the user is received in response to a wake word utterance of the user.

6. The voice control hub computing system of claim 1, including further instructions that, when executed, cause the voice control hub computing system to:
   synthesize a speech response to the user responsive to the utterance of the user; and
   cause the speech response to be output in an audio speaker of a computing device of the user.

7. The voice control hub computing system of claim 1, including further instructions that, when executed, cause the voice control hub computing system to:
   set a value in a global context visible to the dynamic object handler.

8. The voice control hub computing system of claim 1, wherein the voice control hub computing system is packaged as a shared object that the enterprise business software application can access to enable voice functionality in the application.

9. A computer-implemented method for enabling voice functionality in an enterprise business software application, comprising:
   receiving a handler registration request specifying a dynamic object handler compiled during application initialization, wherein the dynamic object handler is configured to respond to voice commands;
   receiving an utterance of a user of the enterprise business software application;
   transmitting the utterance of the user to a remote cloud services layer;
   converting the utterance of the user to a text string representing speech-to-text output using a custom speech model, wherein the custom speech model filters out background noise from the utterance of the user;
   analyzing the text string using one or more trained machine learning models to generate an intent and an entity corresponding to a task,
      wherein at least one of the models is trained using a respective command interpreter for interpreting utterances of a respective type, and at least one of the models is a convolutional neural network trained to map entities to graphical user interface components;

receiving the intent and the entity from the remote cloud services layer, wherein the intent is associated with the entity;

dispatching the intent and the entity to the dynamic object handler; and analyzing the intent, the entity, and an image of a graphical user interface using at least one of the one or more trained machine learning models to map the entity to a component of the graphical user interface corresponding to performance of the task.

10. The computer-implemented method of claim 9, further comprising:

receiving the text string representing speech-to-text output from the remote cloud services layer.

11. The computer-implemented method of claim 9, further comprising:

receiving a channel subscription specifying a channel and one or both of (i) the intent type, and (ii) the entity type, and based on the channel subscription, dispatching the intent and the entity to the channel.

12. The computer-implemented method of claim 9, further comprising:

compiling the dynamic object handler as a dynamic function.

13. The computer-implemented method of claim 9, further comprising:

receiving utterance of the user in response to the user uttering a wake word.

14. The computer-implemented method of claim 9, further comprising:

synthesizing a speech response to the user responsive to the utterance of the user; and causing the speech response to be output in an audio speaker of a computing device of the user.

15. The computer-implemented method of claim 14, wherein synthesizing the speech response to the user responsive to the utterance to the user is part of a multi-turn interaction with the user.

16. A non-transitory computer readable medium containing program instructions that when executed, cause a computer to:

receive a handler registration request specifying a dynamic object handler compiled during application initialization, wherein the dynamic object handler is configured to respond to voice commands;

receive an utterance of a user of an enterprise business software application;

transmit the utterance of the user to a remote cloud services layer;

convert the utterance of the user to a text string representing speech-to-text output using a custom speech model, wherein the custom speech model filters out background noise from the utterance of the user;

analyze the text string using one or more trained machine learning models to generate an intent and an entity corresponding to a task, wherein at least one of the models is trained using a respective command interpreter for interpreting utterances of a respective type, and at least one of the models is a convolutional neural network trained to map entities to graphical user interface components;

receive the intent and the entity from the remote cloud services layer, wherein the intent is associated with the entity;

dispatch the intent and the entity to the dynamic object handler; and analyze the intent, the entity, and an image of a graphical user interface using at least one of the one or more trained machine learning models to map the entity to a component of the graphical user interface corresponding to performance of the task.

17. The non-transitory computer readable medium of claim 16 containing further program instructions that when executed, cause a computer to:

receive the text string representing speech-to-text output from the remote cloud services layer.

18. The non-transitory computer readable medium of claim 16 containing further program instructions that when executed, cause a computer to:

receive a channel subscription specifying a channel and one or both of (i) the intent type, and (ii) the entity type; and based on the channel subscription, dispatch the intent and the entity to the channel.

19. The non-transitory computer readable medium of claim 16 containing further program instructions that when executed, cause a computer to:

synthesize a speech response to the user responsive to the utterance of the user; and cause the speech response to be output in an audio speaker of a computing device of the user.

20. The non-transitory computer readable medium of claim 16 containing further program instructions that when executed, cause a computer to:

set a value in a global context visible to the dynamic object handler.

\* \* \* \* \*